US 8,402,356 B2

United States Patent
Martinez et al.

(10) Patent No.: US 8,402,356 B2
(45) Date of Patent: Mar. 19, 2013

(54) METHODS, SYSTEMS AND APPARATUS FOR DELIVERY OF MEDIA

(75) Inventors: Ronald Martinez, San Francisco, CA (US); Marc Davis, San Francisco, CA (US)

(73) Assignee: Yahoo! Inc., Sunnyvale, CA (US)

( * ) Notice: Subject to any disclaimer, the term of this patent is extended or adjusted under 35 U.S.C. 154(b) by 912 days.

(21) Appl. No.: 11/562,979

(22) Filed: Nov. 22, 2006

(65) Prior Publication Data

US 2008/0117202 A1  May 22, 2008

(51) Int. Cl.
*G06F 17/00* (2006.01)
(52) U.S. Cl. ............... 715/201; 705/14.36; 705/14.4; 705/14.49; 705/14.58; 705/14.67
(58) Field of Classification Search .............. 715/201; 705/14.36, 14.4, 14.49, 14.58, 14.67
See application file for complete search history.

(56) References Cited

U.S. PATENT DOCUMENTS

| | | | |
|---|---|---|---|
| 5,446,891 A | 8/1995 | Kaplan et al. | |
| 5,493,692 A | 2/1996 | Theimer et al. | |
| 5,583,763 A | 12/1996 | Atcheson et al. | |
| 5,651,068 A * | 7/1997 | Klemba et al. | 713/159 |
| 5,761,662 A | 6/1998 | Dasan | |
| 5,764,906 A | 6/1998 | Edelstein et al. | |
| 5,781,879 A | 7/1998 | Arnold et al. | |
| 5,784,365 A | 7/1998 | Ikeda | |
| 5,794,210 A | 8/1998 | Goldhaber et al. | |
| 5,802,510 A | 9/1998 | Jones | |
| 5,835,087 A | 11/1998 | Herz | |
| 5,903,848 A | 5/1999 | Takahashi | |
| 5,920,854 A | 7/1999 | Kirsch et al. | |
| 6,014,638 A * | 1/2000 | Burge et al. | 705/27 |
| 6,021,403 A | 2/2000 | Horvitz et al. | |
| 6,047,234 A | 4/2000 | Cherveny et al. | |
| 6,098,065 A | 8/2000 | Skillen et al. | |
| 6,112,181 A | 8/2000 | Shear et al. | |
| 6,157,924 A | 12/2000 | Austin | |

(Continued)

FOREIGN PATENT DOCUMENTS

| | | |
|---|---|---|
| EP | 1362302 | 11/2003 |
| JP | 2002-082858 | 3/2002 |

(Continued)

OTHER PUBLICATIONS

Kaasinen, E., "Behaviour & Information Technology", *Taylor & Francis*, vol. 24, No. 1, Jan./Feb. 2005, pp. 37-49, (Abstract only attached).

(Continued)

*Primary Examiner* — Doug Hutton, Jr.
*Assistant Examiner* — Andrew Dyer
(74) *Attorney, Agent, or Firm* — James J. DeCarlo; Greenberg Traurig, LLP

(57) ABSTRACT

Systems, methods and apparatus for collecting data and presenting media to a user are provided. The systems generally includes a data gathering module associated with an electronic device. The data gathering module communicates gathered data to a management module, which manages at least one user profile based on the gathered data. The management module may select media for presentation to a user based on the user profile, and the selected media may be displayed to the user via a media output device co-located with the user, such as a display of the user's mobile electronic device or a television, computer, billboard or other display co-located with the user. Related methods are also provided.

20 Claims, 20 Drawing Sheets

U.S. PATENT DOCUMENTS

| | | |
|---|---|---|
| 6,169,992 B1 | 1/2001 | Beall et al. |
| 6,212,552 B1 | 4/2001 | Biliris et al. |
| 6,266,667 B1 | 7/2001 | Olsson |
| 6,314,365 B1 | 11/2001 | Smith |
| 6,314,399 B1 | 11/2001 | Deligne et al. |
| 6,324,519 B1 | 11/2001 | Eldering |
| 6,327,590 B1 | 12/2001 | Chidlovskii et al. |
| 6,446,065 B1 | 9/2002 | Nishioka et al. |
| 6,490,698 B1 | 12/2002 | Horvitz et al. |
| 6,502,033 B1 | 12/2002 | Phuyal |
| 6,523,172 B1 | 2/2003 | Martinez-Guerra et al. |
| 6,571,279 B1* | 5/2003 | Herz et al. ............ 709/217 |
| 6,601,012 B1 | 7/2003 | Horvitz et al. |
| 6,615,134 B2* | 9/2003 | Ando ............ 701/209 |
| 6,662,195 B1 | 12/2003 | Langseth et al. |
| 6,665,640 B1 | 12/2003 | Bennett et al. |
| 6,694,316 B1 | 2/2004 | Langseth et al. |
| 6,701,311 B2 | 3/2004 | Biebesheimer et al. |
| 6,701,315 B1 | 3/2004 | Austin |
| 6,708,203 B1 | 3/2004 | Makar et al. |
| 6,731,940 B1 | 5/2004 | Nagendran |
| 6,741,980 B1 | 5/2004 | Langseth et al. |
| 6,757,661 B1 | 6/2004 | Blaser et al. |
| 6,773,344 B1 | 8/2004 | Gabai et al. |
| 6,781,920 B2 | 8/2004 | Bates et al. |
| 6,785,670 B1 | 8/2004 | Chiang et al. |
| 6,789,073 B1 | 9/2004 | Lunenfeld |
| 6,813,501 B2* | 11/2004 | Kinnunen et al. ......... 455/456.2 |
| 6,816,850 B2 | 11/2004 | Culliss |
| 6,829,333 B1 | 12/2004 | Frazier |
| 6,834,195 B2 | 12/2004 | Brandenberg et al. |
| 6,842,761 B2 | 1/2005 | Diamond et al. |
| 6,845,370 B2 | 1/2005 | Burkey et al. |
| 6,850,252 B1 | 2/2005 | Hoffberg |
| 6,853,913 B2 | 2/2005 | Cherveny et al. |
| 6,853,982 B2 | 2/2005 | Smith et al. |
| 6,882,977 B1 | 4/2005 | Miller |
| 6,904,160 B2 | 6/2005 | Burgess |
| 6,931,254 B1 | 8/2005 | Egner et al. |
| 6,958,984 B2* | 10/2005 | Kotzin ............ 370/335 |
| 6,961,660 B2 | 11/2005 | Underbrink et al. |
| 6,961,731 B2 | 11/2005 | Holbrook |
| 6,985,839 B1 | 1/2006 | Motamedi et al. |
| 7,002,942 B2* | 2/2006 | Kotzin ............ 370/338 |
| 7,010,492 B1 | 3/2006 | Bassett et al. |
| 7,027,801 B1 | 4/2006 | Hall et al. |
| 7,058,508 B2 | 6/2006 | Combs et al. |
| 7,058,626 B1 | 6/2006 | Pan et al. |
| 7,062,510 B1* | 6/2006 | Eldering ............ 707/104.1 |
| 7,065,345 B2 | 6/2006 | Carlton et al. |
| 7,065,483 B2 | 6/2006 | Decary et al. |
| 7,069,308 B2 | 6/2006 | Abrams |
| 7,073,129 B1 | 7/2006 | Robarts et al. |
| 7,110,776 B2 | 9/2006 | Sambin |
| 7,113,771 B2* | 9/2006 | Kotzin ............ 455/414.1 |
| 7,143,091 B2 | 11/2006 | Charnock et al. |
| 7,149,696 B2 | 12/2006 | Shimizu et al. |
| 7,181,438 B1 | 2/2007 | Szabo |
| 7,185,286 B2 | 2/2007 | Zondervan |
| 7,194,512 B1 | 3/2007 | Creemer et al. |
| 7,203,597 B2 | 4/2007 | Sato et al. |
| 7,209,915 B1 | 4/2007 | Taboada et al. |
| 7,219,013 B1 | 5/2007 | Young et al. |
| 7,236,969 B1 | 6/2007 | Skillen et al. |
| 7,254,581 B2 | 8/2007 | Johnson et al. |
| 7,257,570 B2 | 8/2007 | Riise et al. |
| 7,305,445 B2 | 12/2007 | Singh et al. |
| 7,320,025 B1 | 1/2008 | Steinberg et al. |
| 7,343,364 B2 | 3/2008 | Bram et al. |
| 7,395,507 B2 | 7/2008 | Robarts et al. |
| 7,404,084 B2 | 7/2008 | Fransdonk |
| 7,437,312 B2 | 10/2008 | Bhatia et al. |
| 7,451,102 B2 | 11/2008 | Nowak |
| 7,461,168 B1 | 12/2008 | Wan |
| 7,490,045 B1* | 2/2009 | Flores et al. ............ 705/1.1 |
| 7,496,548 B1 | 2/2009 | Ershov |
| 7,522,995 B2 | 4/2009 | Nortrup |
| 7,529,811 B2 | 5/2009 | Thompson |
| 7,562,122 B2 | 7/2009 | Oliver et al. |
| 7,577,665 B2 | 8/2009 | Rameer et al. |
| 7,584,215 B2 | 9/2009 | Saari et al. |
| 7,624,104 B2 | 11/2009 | Berkhin et al. |
| 7,624,146 B1 | 11/2009 | Brogne et al. |
| 7,630,986 B1* | 12/2009 | Herz et al. ............ 1/1 |
| 7,634,465 B2 | 12/2009 | Sareen et al. |
| 7,657,907 B2 | 2/2010 | Fennan et al. |
| 7,681,147 B2 | 3/2010 | Richardson-Bunbury et al. |
| 7,725,492 B2 | 5/2010 | Sittig et al. |
| 7,729,901 B2 | 6/2010 | Richardson-Bunbury et al. |
| 7,769,740 B2 | 8/2010 | Martinez et al. |
| 7,769,745 B2 | 8/2010 | Naaman |
| 7,783,622 B1 | 8/2010 | Vandermolen et al. |
| 7,792,040 B2 | 9/2010 | Nair |
| 7,802,724 B1 | 9/2010 | Nohr |
| 7,822,871 B2 | 10/2010 | Stolorz et al. |
| 7,831,586 B2 | 11/2010 | Reitter et al. |
| 7,865,308 B2 | 1/2011 | Athsani |
| 7,925,708 B2 | 4/2011 | Davis |
| 2001/0013009 A1* | 8/2001 | Greening et al. ............ 705/10 |
| 2001/0035880 A1 | 11/2001 | Musatov et al. |
| 2001/0047384 A1* | 11/2001 | Croy ............ 709/203 |
| 2001/0052058 A1 | 12/2001 | Ohran |
| 2002/0014742 A1 | 2/2002 | Conte et al. |
| 2002/0019849 A1 | 2/2002 | Tuvey et al. |
| 2002/0019857 A1 | 2/2002 | Harjanto |
| 2002/0023091 A1 | 2/2002 | Silberberg et al. |
| 2002/0023230 A1 | 2/2002 | Bolnick et al. |
| 2002/0035605 A1 | 3/2002 | McDowell et al. |
| 2002/0049968 A1 | 4/2002 | Wilson et al. |
| 2002/0052786 A1 | 5/2002 | Kim et al. |
| 2002/0052875 A1 | 5/2002 | Smith et al. |
| 2002/0054089 A1 | 5/2002 | Nicholas |
| 2002/0065844 A1 | 5/2002 | Robinson et al. |
| 2002/0069218 A1 | 6/2002 | Sull et al. |
| 2002/0099695 A1 | 7/2002 | Abaijian et al. |
| 2002/0103870 A1 | 8/2002 | Shouji |
| 2002/0111956 A1 | 8/2002 | Yeo et al. |
| 2002/0112035 A1 | 8/2002 | Carey |
| 2002/0133400 A1 | 9/2002 | Terry et al. |
| 2002/0138331 A1 | 9/2002 | Hosea et al. |
| 2002/0152267 A1 | 10/2002 | Lennon |
| 2002/0169840 A1 | 11/2002 | Sheldon et al. |
| 2002/0173907 A1* | 11/2002 | Ando ............ 701/209 |
| 2002/0173971 A1 | 11/2002 | Stirpe et al. |
| 2002/0178161 A1 | 11/2002 | Brezin et al. |
| 2002/0198786 A1 | 12/2002 | Tripp et al. |
| 2003/0008661 A1 | 1/2003 | Joyce et al. |
| 2003/0009367 A1 | 1/2003 | Morrison |
| 2003/0009495 A1 | 1/2003 | Adjaoute |
| 2003/0027558 A1 | 2/2003 | Eisinger |
| 2003/0032409 A1* | 2/2003 | Hutcheson et al. ............ 455/414 |
| 2003/0033331 A1* | 2/2003 | Sena et al. ............ 707/513 |
| 2003/0033394 A1 | 2/2003 | Stine et al. |
| 2003/0055722 A1* | 3/2003 | Perreault et al. ............ 705/14 |
| 2003/0065762 A1 | 4/2003 | Stolorz et al. |
| 2003/0069877 A1 | 4/2003 | Grefenstette et al. |
| 2003/0069880 A1 | 4/2003 | Harrison et al. |
| 2003/0078978 A1 | 4/2003 | Lardin et al. |
| 2003/0080992 A1 | 5/2003 | Haines |
| 2003/0126250 A1 | 7/2003 | Jhanji |
| 2003/0149574 A1* | 8/2003 | Rudman ............ 705/1 |
| 2003/0154293 A1 | 8/2003 | Zmolek |
| 2003/0165241 A1 | 9/2003 | Fransdonk |
| 2003/0191816 A1 | 10/2003 | Landress et al. |
| 2004/0010492 A1 | 1/2004 | Zhao et al. |
| 2004/0015588 A1 | 1/2004 | Cotte |
| 2004/0030798 A1 | 2/2004 | Andersson et al. |
| 2004/0034752 A1 | 2/2004 | Ohran |
| 2004/0043758 A1 | 3/2004 | Sorvari et al. |
| 2004/0044736 A1 | 3/2004 | Austin-Lane et al. |
| 2004/0070602 A1 | 4/2004 | Kobuya et al. |
| 2004/0073483 A1* | 4/2004 | Cohen et al. ............ 705/14 |
| 2004/0139025 A1 | 7/2004 | Coleman |
| 2004/0139047 A1 | 7/2004 | Rechsteiner |
| 2004/0148341 A1 | 7/2004 | Cotte |
| 2004/0152477 A1 | 8/2004 | Wu et al. |
| 2004/0183829 A1 | 9/2004 | Kontny et al. |

| | | |
|---|---|---|
| 2004/0201683 A1 | 10/2004 | Murashita et al. |
| 2004/0203851 A1 | 10/2004 | Vetro et al. |
| 2004/0203909 A1 | 10/2004 | Koster |
| 2004/0209602 A1* | 10/2004 | Joyce et al. ............... 455/414.1 |
| 2004/0243623 A1 | 12/2004 | Ozer et al. |
| 2004/0260804 A1 | 12/2004 | Grabarnik et al. |
| 2004/0267880 A1* | 12/2004 | Patiejunas ................... 709/203 |
| 2005/0005242 A1 | 1/2005 | Hoyle |
| 2005/0015451 A1 | 1/2005 | Sheldon et al. |
| 2005/0015599 A1 | 1/2005 | Wang et al. |
| 2005/0050027 A1 | 3/2005 | Yeh |
| 2005/0050043 A1 | 3/2005 | Pyhalammi et al. |
| 2005/0055321 A1 | 3/2005 | Fratkina |
| 2005/0060381 A1 | 3/2005 | Huynh et al. |
| 2005/0065950 A1 | 3/2005 | Chaganti et al. |
| 2005/0065980 A1 | 3/2005 | Hyatt et al. |
| 2005/0076060 A1 | 4/2005 | Finn et al. |
| 2005/0086187 A1 | 4/2005 | Grosser et al. |
| 2005/0105552 A1 | 5/2005 | Osterling |
| 2005/0108213 A1 | 5/2005 | Riise et al. |
| 2005/0120006 A1 | 6/2005 | Nye |
| 2005/0131727 A1 | 6/2005 | Sezan et al. |
| 2005/0149397 A1 | 7/2005 | Morgenstern et al. |
| 2005/0151849 A1 | 7/2005 | Fitzhugh et al. |
| 2005/0159220 A1 | 7/2005 | Wilson et al. |
| 2005/0159970 A1 | 7/2005 | Buyukkokten et al. |
| 2005/0160080 A1 | 7/2005 | Dawson |
| 2005/0165699 A1 | 7/2005 | Hahn-Carlson |
| 2005/0166240 A1 | 7/2005 | Kim |
| 2005/0171955 A1 | 8/2005 | Hull et al. |
| 2005/0177385 A1 | 8/2005 | Hull et al. |
| 2005/0182824 A1 | 8/2005 | Cotte |
| 2005/0183110 A1 | 8/2005 | Anderson |
| 2005/0187786 A1* | 8/2005 | Tsai ................... 705/1 |
| 2005/0192025 A1 | 9/2005 | Kaplan |
| 2005/0203801 A1 | 9/2005 | Morgenstern et al. |
| 2005/0216295 A1 | 9/2005 | Abrahamsohn |
| 2005/0216300 A1* | 9/2005 | Appelman et al. ................ 705/1 |
| 2005/0219375 A1 | 10/2005 | Hasegawa et al. |
| 2005/0234781 A1 | 10/2005 | Morgenstern |
| 2005/0273510 A1 | 12/2005 | Schuh |
| 2006/0020631 A1 | 1/2006 | Cheong Wan et al. |
| 2006/0026013 A1 | 2/2006 | Kraft |
| 2006/0026067 A1 | 2/2006 | Nicholas et al. |
| 2006/0031108 A1 | 2/2006 | Oran |
| 2006/0040719 A1 | 2/2006 | Plimi |
| 2006/0047563 A1 | 3/2006 | Wardell |
| 2006/0047615 A1 | 3/2006 | Ravin |
| 2006/0053058 A1 | 3/2006 | Hotchkiss et al. |
| 2006/0069612 A1 | 3/2006 | Hurt et al. |
| 2006/0069616 A1 | 3/2006 | Bau |
| 2006/0069749 A1* | 3/2006 | Herz et al. ................... 709/219 |
| 2006/0074853 A1 | 4/2006 | Liu et al. |
| 2006/0085392 A1 | 4/2006 | Wang et al. |
| 2006/0085419 A1 | 4/2006 | Rosen |
| 2006/0089876 A1* | 4/2006 | Boys ................... 705/14 |
| 2006/0116924 A1 | 6/2006 | Angeles et al. |
| 2006/0123053 A1* | 6/2006 | Scannell, Jr. ................ 707/104.1 |
| 2006/0129313 A1 | 6/2006 | Becker |
| 2006/0129605 A1 | 6/2006 | Doshi |
| 2006/0161894 A1 | 7/2006 | Oustiougov et al. |
| 2006/0168591 A1 | 7/2006 | Hunsinger et al. |
| 2006/0173838 A1 | 8/2006 | Garg et al. |
| 2006/0173985 A1 | 8/2006 | Moore |
| 2006/0178822 A1 | 8/2006 | Lee |
| 2006/0184508 A1 | 8/2006 | Fuselier et al. |
| 2006/0184579 A1 | 8/2006 | Mills |
| 2006/0212330 A1 | 9/2006 | Savilampi |
| 2006/0212401 A1 | 9/2006 | Amerally et al. |
| 2006/0227945 A1 | 10/2006 | Runge et al. |
| 2006/0235816 A1 | 10/2006 | Yang et al. |
| 2006/0236257 A1 | 10/2006 | Othmer et al. |
| 2006/0242139 A1 | 10/2006 | Butterfield et al. |
| 2006/0242178 A1 | 10/2006 | Butterfield et al. |
| 2006/0242259 A1 | 10/2006 | Vallath et al. |
| 2006/0258368 A1 | 11/2006 | Granito et al. |
| 2006/0282455 A1 | 12/2006 | Lee |
| 2007/0013560 A1 | 1/2007 | Casey |
| 2007/0015519 A1 | 1/2007 | Casey |
| 2007/0043766 A1* | 2/2007 | Nicholas et al. ........... 707/104.1 |
| 2007/0067104 A1 | 3/2007 | Mays |
| 2007/0067267 A1 | 3/2007 | Ives |
| 2007/0072591 A1 | 3/2007 | McGary et al. |
| 2007/0073583 A1 | 3/2007 | Grouf et al. |
| 2007/0073641 A1 | 3/2007 | Perry et al. |
| 2007/0086061 A1 | 4/2007 | Robbins |
| 2007/0087756 A1 | 4/2007 | Hoffberg |
| 2007/0088852 A1 | 4/2007 | Levkovitz |
| 2007/0100956 A1 | 5/2007 | Kumar |
| 2007/0112762 A1 | 5/2007 | Brubaker |
| 2007/0121843 A1 | 5/2007 | Atazky et al. |
| 2007/0130137 A1 | 6/2007 | Oliver et al. |
| 2007/0136048 A1 | 6/2007 | Richardson-Bunbury et al. |
| 2007/0136235 A1 | 6/2007 | Hess |
| 2007/0136256 A1 | 6/2007 | Kapur et al. |
| 2007/0136689 A1 | 6/2007 | Richardson-Bunbury et al. |
| 2007/0143345 A1 | 6/2007 | Jones et al. |
| 2007/0150168 A1 | 6/2007 | Balcom et al. |
| 2007/0150359 A1 | 6/2007 | Lim et al. |
| 2007/0155411 A1 | 7/2007 | Morrison |
| 2007/0161382 A1 | 7/2007 | Melinger et al. |
| 2007/0162850 A1 | 7/2007 | Adler |
| 2007/0168430 A1 | 7/2007 | Brun et al. |
| 2007/0173266 A1 | 7/2007 | Barnes |
| 2007/0179792 A1 | 8/2007 | Kramer |
| 2007/0185599 A1 | 8/2007 | Robinson et al. |
| 2007/0192299 A1 | 8/2007 | Zuckerberg et al. |
| 2007/0198506 A1 | 8/2007 | Attaran Rezaei et al. |
| 2007/0198563 A1 | 8/2007 | Apparao et al. |
| 2007/0203591 A1 | 8/2007 | Bowerman |
| 2007/0219708 A1 | 9/2007 | Brasche et al. |
| 2007/0233585 A1 | 10/2007 | Ben Simon et al. |
| 2007/0239348 A1 | 10/2007 | Cheung |
| 2007/0239517 A1 | 10/2007 | Chung et al. |
| 2007/0259653 A1 | 11/2007 | Tang et al. |
| 2007/0260508 A1 | 11/2007 | Barry et al. |
| 2007/0260604 A1 | 11/2007 | Haeuser et al. |
| 2007/0271297 A1 | 11/2007 | Jaffe et al. |
| 2007/0271340 A1 | 11/2007 | Goodman et al. |
| 2007/0273758 A1 | 11/2007 | Mendoza et al. |
| 2007/0276940 A1 | 11/2007 | Abraham et al. |
| 2007/0282621 A1 | 12/2007 | Altman et al. |
| 2007/0282675 A1 | 12/2007 | Varghese |
| 2007/0288278 A1 | 12/2007 | Alexander et al. |
| 2008/0005313 A1 | 1/2008 | Flake et al. |
| 2008/0005651 A1 | 1/2008 | Grefenstette et al. |
| 2008/0010206 A1 | 1/2008 | Coleman |
| 2008/0021957 A1 | 1/2008 | Medved et al. |
| 2008/0026804 A1 | 1/2008 | Baray et al. |
| 2008/0028031 A1 | 1/2008 | Bailey et al. |
| 2008/0040283 A1 | 2/2008 | Morris |
| 2008/0046298 A1 | 2/2008 | Ben-Yehuda et al. |
| 2008/0070588 A1 | 3/2008 | Morin |
| 2008/0086356 A1 | 4/2008 | Glassman et al. |
| 2008/0086431 A1 | 4/2008 | Robinson et al. |
| 2008/0091796 A1 | 4/2008 | Story et al. |
| 2008/0096664 A1 | 4/2008 | Baray et al. |
| 2008/0102911 A1 | 5/2008 | Campbell et al. |
| 2008/0104061 A1 | 5/2008 | Rezaei |
| 2008/0104227 A1 | 5/2008 | Birnie et al. |
| 2008/0109761 A1 | 5/2008 | Stambaugh |
| 2008/0109843 A1 | 5/2008 | Ullah |
| 2008/0114751 A1 | 5/2008 | Cramer et al. |
| 2008/0120183 A1 | 5/2008 | Park |
| 2008/0120308 A1 | 5/2008 | Martinez et al. |
| 2008/0120690 A1 | 5/2008 | Norlander et al. |
| 2008/0126960 A1 | 5/2008 | Naaman |
| 2008/0126961 A1 | 5/2008 | Naaman |
| 2008/0133750 A1 | 6/2008 | Grabarnik et al. |
| 2008/0147655 A1 | 6/2008 | Sinha et al. |
| 2008/0147743 A1 | 6/2008 | Taylor et al. |
| 2008/0148175 A1 | 6/2008 | Naaman et al. |
| 2008/0154720 A1 | 6/2008 | Gounares |
| 2008/0163284 A1 | 7/2008 | Martinez et al. |
| 2008/0172632 A1 | 7/2008 | Stambaugh |
| 2008/0177706 A1 | 7/2008 | Yuen |
| 2008/0270579 A1 | 10/2008 | Herz et al. |
| 2008/0285886 A1 | 11/2008 | Allen |

| | | | |
|---|---|---|---|
| 2008/0301250 | A1 | 12/2008 | Hardy et al. |
| 2008/0320001 | A1 | 12/2008 | Gaddam |
| 2009/0005987 | A1 | 1/2009 | Vengroff et al. |
| 2009/0006336 | A1 | 1/2009 | Forstall et al. |
| 2009/0012934 | A1 | 1/2009 | Yerigan |
| 2009/0012965 | A1 | 1/2009 | Franken |
| 2009/0043844 | A1 | 2/2009 | Zimmet et al. |
| 2009/0044132 | A1 | 2/2009 | Combel et al. |
| 2009/0063254 | A1 | 3/2009 | Paul et al. |
| 2009/0070186 | A1 | 3/2009 | Buiten et al. |
| 2009/0073191 | A1 | 3/2009 | Smith et al. |
| 2009/0076889 | A1 | 3/2009 | Jhanji |
| 2009/0100052 | A1 | 4/2009 | Stern et al. |
| 2009/0106356 | A1 | 4/2009 | Brase et al. |
| 2009/0125517 | A1 | 5/2009 | Krishnaswamy et al. |
| 2009/0132941 | A1 | 5/2009 | Pilskalns et al. |
| 2009/0144141 | A1 | 6/2009 | Dominowska et al. |
| 2009/0150501 | A1 | 6/2009 | Davis et al. |
| 2009/0150507 | A1 | 6/2009 | Davis et al. |
| 2009/0165051 | A1 | 6/2009 | Armaly |
| 2009/0171939 | A1 | 7/2009 | Athsani et al. |
| 2009/0177603 | A1 | 7/2009 | Honisch |
| 2009/0187637 | A1 | 7/2009 | Wu et al. |
| 2009/0204484 | A1 | 8/2009 | Johnson |
| 2009/0204672 | A1 | 8/2009 | Jetha et al. |
| 2009/0204676 | A1 | 8/2009 | Parkinson et al. |
| 2009/0216606 | A1 | 8/2009 | Coffman et al. |
| 2009/0222302 | A1 | 9/2009 | Higgins |
| 2009/0222303 | A1 | 9/2009 | Higgins |
| 2009/0222304 | A1 | 9/2009 | Higgins |
| 2009/0234814 | A1 | 9/2009 | Boerries et al. |
| 2009/0234909 | A1 | 9/2009 | Strandeil et al. |
| 2009/0249482 | A1 | 10/2009 | Sarathy |
| 2009/0265431 | A1 | 10/2009 | Janie et al. |
| 2009/0281997 | A1 | 11/2009 | Jain |
| 2009/0299837 | A1 | 12/2009 | Steelberg et al. |
| 2009/0313546 | A1 | 12/2009 | Katpelly et al. |
| 2009/0320047 | A1 | 12/2009 | Khan et al. |
| 2009/0323519 | A1 | 12/2009 | Pun |
| 2009/0328087 | A1 | 12/2009 | Higgins et al. |
| 2010/0002635 | A1 | 1/2010 | Eklund |
| 2010/0014444 | A1 | 1/2010 | Ghanadan et al. |
| 2010/0063993 | A1 | 3/2010 | Higgins et al. |
| 2010/0070368 | A1 | 3/2010 | Choi et al. |
| 2010/0118025 | A1 | 5/2010 | Smith et al. |
| 2010/0125563 | A1 | 5/2010 | Nair et al. |
| 2010/0125569 | A1 | 5/2010 | Nair et al. |
| 2010/0125604 | A1 | 5/2010 | Martinez et al. |
| 2010/0125605 | A1 | 5/2010 | Nair et al. |
| 2010/0185642 | A1 | 7/2010 | Higgins et al. |

FOREIGN PATENT DOCUMENTS

| | | |
|---|---|---|
| JP | 2002312559 | 10/2002 |
| JP | 2003-108592 | 4/2003 |
| JP | 2005-038210 | 2/2005 |
| JP | 2005-250744 | 9/2005 |
| JP | 2005-275647 | 10/2005 |
| JP | 2006-059053 | 3/2006 |
| KR | 1020000036897 | 7/2000 |
| KR | 1020000054319 | 9/2000 |
| KR | 10-2000-0064105 | 11/2000 |
| KR | 1020030049173 | 6/2003 |
| KR | 10-0801662 | 2/2005 |
| KR | 1020060043333 | 5/2006 |
| KR | 102007034094 | 3/2007 |
| KR | 1020070073180 | 7/2007 |
| KR | 1020080048802 | 6/2008 |
| WO | WO 2005/122013 | 12/2005 |
| WO | WO 2006074305 | 1/2006 |
| WO | WO2006/116196 | 11/2006 |
| WO | WO 2007/022137 | 2/2007 |
| WO | WO 2007/027453 | 3/2007 |
| WO | WO 2007070358 | 6/2007 |
| WO | WO2007113546 | 10/2007 |

OTHER PUBLICATIONS

Perkowitz, Mike et al., "Utilizing Online Communities to Facilitate Physical World Interactions", *The International Conference on Communities and Technologies*, Sep. 19, 2003, Amsterdam, pp. 1-6.

Sheppard, Brett, "The Rights Stuff: The Integration of Enterprise Digital Rights Management Into an Enterprise Architecture", *EContent*, vol. 29, No. 9, Nov. 2006, p. 38, 40-44, (pp. 1-7 of attached).

Voight, Joan et al., "Lessons for Today's Digital Market", *ADWEEK.COM*, Oct. 2, 2006, pp. 1-6.

"Dave.TV and Eye Music Network Empower Users to Create Their Own Music TV Channel on Their Sites With New IPTV Channel", www.danenw.com/2006, Sep. 13, 2006, pp. 1-2.

"Reality Digital Debuts Opus", www.lightreading.com, Sep. 25, 2006, pp. 1.

International Search Report (PCT/US2007/084807) dated May 27, 2008.

U.S. Appl. No. 12/409,867, filed Mar. 24, 2009, King.
U.S. Appl. No. 12/540,098, filed Aug. 12, 2009, Martinez.
U.S. Appl. No. 12/536,892, filed Aug. 6, 2009, King.
U.S. Appl. No. 12/540,588, filed Aug. 13, 2009, Tendjoukian.
U.S. Appl. No. 12/015,115, filed Jan. 16, 2006, Higgins.
U.S. Appl. No. 12/180,486, filed Jul. 25, 2008, Higgins.
U.S. Appl. No. 12/180,499, filed Jul. 25, 2008, Higgins.
U.S. Appl. No. 12/015,146, filed Jan. 16, 2008, Higgins.
U.S. Appl. No. 12/041,088, filed Mar. 3, 2008, Higgins.
U.S. Appl. No. 12/041,062, filed Mar. 3, 2008, Higgins.
U.S. Appl. No. 12/041,054, filed Mar. 3, 2008, Higgins.
U.S. Appl. No. 12/540,269, filed Aug. 12, 2009, Kalaboukis.
U.S. Appl. No. 11/969,815, filed Jan. 4, 2004, Davis.
U.S. Appl. No. 12/182,111, filed Jul. 29, 2008, Davis.
U.S. Appl. No. 12/434,575, filed May 1, 2009, O'Sullivan.
U.S. Appl. No. 12/434,580, filed May 1, 2009, O'Sullivan.
U.S. Appl. No. 12/407,690, filed Mar. 19, 2009, Davis.
U.S. Appl. No. 12/407,681, filed Mar. 19, 2009, Athsani.

Office Action U.S. Appl. No. 12/041,054 dated Oct. 27, 2010; 15 pages.

Office Action U.S. Appl. No. 12/041,062 dated Oct. 28, 2010; 12 pages.

Office Action U.S. Appl. No. 12/041,088 dated Oct. 4, 2010; 18 pages.

Almieda, R.B. et al. "A Community-Aware Search Engine," WWW2004, New York, NY, May 17-22, 2004, pp. 413-421.

Anonymous. (Jul. 16, 2006). MyFantasyLeague Fantasy Football League Management—Features, located at <http://web.archive.org/web/20060716072900/www.myfantasyleague.com/features.htm >, last visited on Feb. 10, 2009, four pages.

Anonymous. (Jul. 17, 2006). "Fantasy Football Lineup Analyzer—Tips for Who to Start & Who to Bench each Week," located at http://web.archive.org/web/200607171633529/www.fantasyfootballstarters.com/lineupAnalyzer.jsp>, last visited on Feb. 10, 2009, one page.

Bharat, K. (Date Unknown). "SearchPad: Explicit Capture of Search Context to Support Web Search," located at <http://www9.org/w9cdrom/173/173.html >, last visited Aug. 1, 2007, 13 pages.

Budzik, J. et al. (2000). "User Interactions with Everyday Applications as Context for Just-in-Time Information Access," Proceeding of the 2000 Conference on Intelligent User Interfaces, eight pages.

Finkelstein, L. et al. (2001). "Placing Search in Context: The Concept Revisited," WWW/O, Hong Kong, May 2-5, 2001, pp. 406-414.

Freyne, J. et al. (2004). "Further Experiments on Collaborative Ranking in Community-Based Web Search," Artificial Intelligence Review, pp. 1-23.

Lieberman, H. (1995) "Letizia: An Agent that Assists Web Browsing," Proceedings of the Fourteenth International Joint Conference on Artificial Intelligence, Aug. 20-25, 1995, six pages.

Mitra, M. et al. (1998). "Improving Automatic Query Expansion," Proceedings of the AMC SIGIR, nine pages.

Rhodes, B.J. et al. (1996). "Remembrance Agent: A Continuously Running Automated Information Retrieval System," Proceedings of the First International Conference on the Practical Application of Intelligent Agents and Multi Agent Technology (PAAM), pp. 487-495, located at <http://www.cc.gatech.edu/fac/Thad.Starner/p/032_40_agents&ubicomp/remembrance-agent . . . >, last visited Aug. 1, 2007, six pages.

Sansbury, C. (Sep. 13, 2005). "Yahoo! Widget for BBC Sports News—Scotland," 32. located at <http://widgets.yahoo.com/gallery/view.php?widget=37220 >, last visited on Feb. 7, 2007, one page.
Yahoo! Inc. (Dec. 7, 2005). "Yahoo! Widget Engine 3.0 Reference Manual Version 3.0," 300 pages.
U.S. Appl. No. 11/562,973, filed Nov. 22, 2006, Martinez.
U.S. Appl. No. 11/562,974, filed Nov. 22, 2006, Martinez.
U.S. Appl. No. 11/562,976, filed Nov. 22, 2006, Martinez.
U.S. Appl. No. 11/593,869, filed Nov. 6, 2006, Naaman.
U.S. Appl. No. 12/237,709, filed Sep. 25, 2008, Martinez.
U.S. Appl. No. 11/353,657, filed Feb. 13, 2006, Naaman.
U.S. Appl. No. 11/437,344, filed May 19, 2006, Jaffe.
U.S. Appl. No. 12/273,317, filed Nov. 18, 2008, Rahul Nair.
U.S. Appl. 11/593,668, filed Nov. 6, 2006, Naaman.
Allen James F., "Maintaining Knowledge About Temporal Intervals", Communications of the ACM, Nov. 1983, vol. 26, No. 11 pp. 832-843; 12 pages.
Press Release, "QUALCOMM Conducts First Live Demonstration of FL Technology on a Wireless Handset", Qualcomm Inc., San Diego, Sep. 27, 2005; 3 pages.
MediaFlo, FLO Technology Overview, Qualcomm Inc. Copyright 2007; 24 pages.
Lin, F. et al., "A unified framework for managing Web-based services.", Information Systems and e-Business Management, vol. 3, Oct. 2005, p. 299, (pp. 1-15 of attached).
Perkowitz, Mike et al., "Utilizing Online Communities to Facilitate Physical World Interactions", The International Conference on Communities and Technologies, Sep. 19, 2003, Amsterdam, pp. 1 6.
Sheppard, Brett,"The Rights Stuff: The Integration of Enterprise Digital Rights Management Into an Enterprise Architecture", ECantent, vol. 29, No. 9, Nov. 2006, p. 38, 40-44, (pp. 1-7 of attached).
Notification of Transmittal of the International Search Report and the Written Opinion of the International Search Authority, or Declaration (PCT/US2007/'084797) dated Mar. 21, 2008; 11 pages.
International Search Report (PCT/US2007/084807) dated May 27, 2008; 3 pages.
Rekimoto, et al., "CyberCode: designing augmented reality environments with visual tags."Proceedings of DARE 2000 on Designing augmented reality environments, Elsinore, Denmark, pp. 1-11 Apr. 12-14, 2000.
"Semacode-URL Barcodes-practical ubiquitous computing", located at http://semacode.org visited on Apr. 13, 2007; 3 pages.
"Technical White Paper: Choosing the best 2D barcode format for mobile apps,"Semacode, Jul. 15, 2006; pp. 1-7 located at http://semacode.org/about/technical/whitepaper/best2_d_code.pdf.
Carbonell, J. et al. (Aug. 24-28, 1998). "The Use of MMR, Diversity-Based Reranking for Reordering Documents and Producing Summaries," SIGIR '98: Proceedings of the 21 S Annual International ACM SIGIR Conference on Research and Development in Information Retrieval: Melbourne, Australia W.B. Croft et al. eds., pp. 335-336.
Cooper, M. et al. (Nov. 2-8, 2003). "Temporal Event Clustering for Digital Photo Collections," MM'03 Berkeley, California, pp. 364-373.
Davis, M. et al. (Oct. 10-16, 2004). "From Context to Content: Leveraging Context to Infer Media Metadata," MM'04 New York, New York. 9 pages.
Davis, M. et al. "From Context to Content: Leveraging Context for Mobile Media Metadata." 9 pages.
Davis, M. et al. "Mobile Media Metadata for Mobile Imaging." Jun. 27-30, 2004; 4 pages.
Davis, M. et al. "Using Context and Similarity for Face and Location Identification."10 pages.
Flickr. Welcome to Flickr—Photo Sharing, located at <http://www.flickr.com > visited on Feb. 26, 2007, one page.
Gargi, U. (Aug. 7, 2003). "Consumer Media Capture: Time-Based Analysis and Event Clustering," Technical Report HPL-2003-165 HP Laboratories Palo Alto, pp. 1-15.
Goldberger, J. et al. The Hungarian Clustering Method, located at <http://scholar.googles.com/scholar?num=20&h1=en&lr=&9=cache:vbwslsm1CisJ:www.openu.acil/Personal_sites/tarnirtassa/Publications/hcm.pdf+goldberger+clustering+method+hungarian> visited on Mar. 1, 2007, twelve pages.

Graham, A. et al. (Jul. 13-17, 2002). Time as Essence for Photo Browsing Through Personal Digital Libraries, JCDL '02 Portland, Oregon. 11 pages.
Jaffe, A. et al. (May 23-26, 2006). "Generating Summaries for Large Collections of Geo-Referenced Photographs," WWW 2006 Edinburgh, Scotland. 2 pages.
Jaffe, A. et al. (Oct. 26-27, 2006). "Generating Summaries and Visualization for Large Collections of Geo-Referenced Photographs," MIR '06 Santa Barbara, California. 11 pages.
Joshi, D. et al. (Oct. 15-16, 2004). "The Story Picturing Engine: Finding Elite Images to Illustrate a Story Using Miitual Reinforcement," MIR '04 New York, New York. 9 pages.
Naaman, M. et al. (Nov. 2003). "From Where to What: Metadata Sharing for Digital Photographs with Geographic Coordinates," In on the Move to Meaningful Internet Systems 2003: Coop/S, DOA, and ODBASE R. Meersman et al. eds., pp. 196-217.
Naaman, M. et al. (Jun. 7-11, 2004). "Automatic Organization for Digital Photographs with Geographic Coordinates" Proceedings of the Fourth ACM/IEEE Joint Conference on Digital Libraries Global Reach and Diverse Impact: Tucson, Arizona, pp. 53-62.
Nair, R. et al. (Nov. 6-11, 2005). "Photo L01: Browsing Multi-User Photo Collections," MM'05 Singapore, pp. 223-224.
0'Hare, N. et al. "Combination of Content Analysis and Context Features for Digital Photograph Retrieval." 7 pages.
Pigeau, A. et al. (Jun. 17, 2005). "Organizing a Personal Image Collection with Statistical Model-Based ICL Clustering on Spatio-Temporal Camera Phone Meta-Data." 25 pages.
Sarvas, R. et al. (Jun. 6-9, 2004). "Metadata Creation System for Mobile Images," MobiSys'04 Boiton, Massachusetts, pp. 36-48.
Toyama, K. et al. (Nov. 2-8, 2003). "Geographic Location Tags on Digital Images," MM '03 Berkeley: California. 12 pages.
"Gutenkarte" Book Catalog, 2006 MetaCarta, Inc., www.gutenkarte.org 11 pgs.
Baron, N.S. et al. (Aug. 30, 2005). "Tethered or Mobile? Use of Away Messages in Instant Messaging by American College Students," Chapter 20.1 in Mobile Communication, Springer: London, England, 31:293-297.
Jones, C. et al. (2004). "Ad-Hoc Meeting System," Final Presentation from Project Group #7, SIMS 202, Fall 2004 Class, UC Berkley School of Information Management & Systems, located at <http://www2.sims.berkeley.edu/academics/courses/is202/f04/phone_project/Group7/ >, last visited on Feb. 2, 2010, thirteen pages.
Manguy, L. et al. (2006). "iTour—Packing the World Into Your Mobile Device," Final Presentation from Project Group #6, SIMS 202, Fall 2004 Class, UC Berkley School of Information Management & Systems, located at <http://www2.sims.berkeley.edu/academics/courses/is202/f04/phone_project/Group6/index.h > ..., last visited on Feb. 2, 2010, ten pages.
Mitnick, S. et al. (2004). "Pillbox," Final Presentation from Project Group #8, SIMS: 02: Fall 2004 Class, UC Berkley School of Information Management & Systems, located at <http://www2.sims.berkeley.edu/academics/courses/is202/f04/phone_project/Group8/about.p . . . ,> last visited on Feb. 2, 2010, seventeen pages.
Wooldridge, M. et al. (2005). "STALK. The Camera-phone Scavenger Hunt!" located at <http://www.stalk.com >, last visited on Dec. 28, 2009, two pages.
www.stalk.com (retrieved on Dec. 29, 2009) pp. 1-2.
Anonymous. (Date Unknown). "CommunityWalk—About," located at <http://www.communitywalk.com/about >, last visited on Mar. 3, 2008, one page.
Anonymous. (Date Unknown). "CommunityWalk Mapping Made Easy," located at <http://www.communitywalk.com/>, last visited on Mar. 3, 2008, one page.
Anonymous. (Date Unknown). "Google Earth User Guide" located at <http://earth.google.com/userguide/v4/>, last visited on Feb. 27, 2008, twelve pages.
Anonymous. (Date Unknown). "Google Earth—Wikipedia, the Free Encyclopedia," located at <http://en.wikipedia.org/wiki/Google_earth >, last visited on Mar. 3, 2008, fourteen pages.
Anonymous. (Date Unknown). "Google Earth User Guide—Using Image Overlays and 3D Models," located at <http://earth.google.com/userguide/v4/ug_imageoverlays.html >, nine pages.

Anonymous. (Date Unknown). "Google Maps," located at <http://en.wikipedia.org/wiki/Google_maps >, last visited on Feb. 27, 2008, eleven pages.
Anonymous. (Date Unknown). "Live Search Maps," located at <http://en.wikipedia.org/wiki/Windows_live_maps >, last visited on Mar. 3, 2008, six pages.
Anonymous. (Date Unknown). "WikiMapia," located at <http://en.wikipedia.org/wiki/WikiMapia >, last visited on Mar. 3, 2008, three pages.
Anonymous. (2007). "Ask.com Maps & Directions," located at <http://maps.ask.com/maps >, last visited on Mar. 3, 2008, one page.
Anonymous. (2007). "Wayfaring Follow You, Follow Me," located at <http://www.wayfaring.com/>, last visited on Mar. 3, 2008, three pages.
Anonymous. (2008). "Platial the People's Atlas," located at <www.platial.com >, last visited on Mar. 3, 2008, one page.
Anonymous. (2008). "Wikimpaia.org ," located at <http://wikimpaia.org/>, last visited on Mar. 3, 2008, one page.
Brunato, M; Battiti R. "PILGRIM: A Location Broker and Mobility-Aware Recommendation System"; Technical report DIT-02-0092, Universita di Trento, Oct. 2002; 8 pages.
Jones et al., Geographic Intention and Modification in Web Search, International Journal of Geographical Information Science, vol. 22, No. 3, pp. 1-20 (Jul. 2008).
Sanderson et al., Analyzing Geographic Queries; Department of Information Studies; University of Sheffield, UK; 2 pages.
Go With the Flow, The Economist Technology Quarterly, vol. 382, Issue 8519, 4 pages, (Mar. 10, 2007).
U.S. Appl. No. 11/952,007, filed Dec. 6, 2007, Davis.
U.S. Appl. No. 11/958,157, filed Dec. 17, 2007, Hayashi.
U.S. Appl. No. 11/952,875, filed Dec. 7, 2007, Davis.
U.S. Appl. No. 11/960,368, filed Dec. 19, 2007, Madsen.
U.S. Appl. No. 11/953,454, filed Dec. 10, 2007, Davis.
U.S. Appl. No. 11/953,494, filed Dec. 10, 2007, Davis.
U.S. Appl. No. 12/236,668, filed Sep. 24, 2008, Davis.
U.S. Appl. No. 12/059,594, filed Mar. 31, 2008, Martinez.
U.S. Appl. No. 12/057,878, filed Mar. 28, 2008, Martinez.
U.S. Appl. No. 12/057,943, filed Mar. 28, 2008, Martinez.
U.S. Appl. No. 11/969,751, filed Jan. 4, 2008, Martinez.
U.S. Appl. No. 12/145,145, filed Jun. 24, 2008, Davis.
U.S. Appl. No. 12/163,249, filed Jun. 27, 2008, Kalaboukis.
U.S. Appl. No. 12/182,969, filed Jul. 30, 2008, Higgins.
U.S. Appl. No. 12/182,813, filed Jul. 30, 2008, Higgins.
U.S. Appl. No. 12/163,314, filed Jul. 27, 2008, Higgins.
U.S. Appl. No. 12/163,396, filed Jun. 27, 2008, Higgins.
U.S. Appl. No. 12/195,969, filed Aug. 21, 2008, Martinez.
U.S. Appl. No. 12/234,000, filed Sep. 19, 2009, Martinez.
U.S. Appl. No. 12/241,590, filed Sep. 30, 2008, Athsani.
U.S. Appl. No. 12/241,687, filed Sep. 30, 2008, Davis.
U.S. Appl. No. 12/206,172, filed Sep. 8, 2008, Higgins.
U.S. Appl. No. 12/273,291, filed Nov. 18, 2008, Nair.
U.S. Appl. No. 12/273,345, filed Nov. 18, 2008, Nair.
U.S. Appl. No. 12/241,198, filed Sep. 30, 2008, Higgins.
U.S. Appl. No. 12/273,259, filed Nov. 18, 2008, Martinez.
U.S. Appl. No. 12/339,355, filed Dec. 19, 2008, Higgins.
U.S. Appl. No. 12/329,038, filed Dec. 5, 2008, Higgins.
U.S. Appl. No. 12/326,553, filed Dec. 2, 2008, Churchill.
U.S. Appl. No. 12/242,656, filed Sep. 30, 2008, Burgener.
U.S. Appl. No. 12/273,371, filed Nov. 18, 2008, Nair.
U.S. Appl. No. 12/357,311, filed Jan. 21, 2009, Higgins.
U.S. Appl. No. 12/357,332, filed Jan. 21, 2009, Higgins.
U.S. Appl. No. 12/357,345, filed Jan. 21, 2009, Higgins.
U.S. Appl. No. 12/357,285, filed Jan. 21, 2009, Higgins.
Axup, Jeff et al., "Conceptualizing New Mobile Devices by Observing Gossip and Social Network Formation Amongst the Extremely Mobile", ITEE Technical Report #459, Dec. 19, 2005, pp. 1-71.
Conhaim, Wallys W., "Social networks: the Internet continues to evolve: where is the money in all this? That is what venture capitalists are asking. (Perspectives)", Information Today, 22, 9, 35(2), Oct. 2005, (pp. 1-5 of attached).
Davis, Marc et al., "From Context to Content: Leveraging Context to Infer Media Metadata", ACM Press, Oct. 10, 2004, pp. 1-8.

Konomi, Shin'ichi et al., "Supporting Colocated Interactions Using RFID and Social Network Displays", Pervasive Computing, Jul.-Sep. 2006, vol. 5, No. 3, pp. 48-56 (pp. 1-4 of attached).
Lin. F. et al., "A unified framework for managing Web-based services.", Information Systems and e-Business Management, vol. 3, Oct. 2005, p. 299, (pp. 1-15 of attached).
Metz, Cade, "MySpace Nation", PC Magazine, Jun. 21, 2006, pp. 1-10 attached.
Roush, Wade, "Social Machines", Continuous Computing Blog, Jul. 5, 2005, pp. 1-21.
Roush, Wade, "Social Machines", Technology Review, Aug. 2005, pp. 45-51.
Sheppard, Brett, "The Rights Stuff: The Integration of Enterprise Digital Rights Management Into an Enterprise Architecture", ECantent, vol. 29, No. 9, Nov. 2006, p. 38, 40-44, (pp. 1-7 of attached).
Voight, Joan et al., "Lessons for Today's Digital Market", ADWEEKCOM, Oct. 2, 2006, pp. 1-6.
"Companies add new communication features to photo sharing.", Digital Imaging Digest, Feb. 2006, pp. 1-2.
"Dave.TV and Eye Music Network Empower Users to Create Their Own Music TV Channel on Their Sites With New IPTV Channel", www.davenw.com/2006, Sep. 13, 2006, pp. 1-2.
"Digital rights management: a primer: developing a user-friendly means of protecting content.(Profile)", Screen Digest, No. 420, p. 305, Sep. 2006, (pp. 1-9 of attached).
"Emerging Markets: What media 2.0 can offer advertisers.", Campaign, Oct. 27, 2006, p. 26, (pp. 1-5 of attached).
"Reality Digital Debuts Opus", www.lightreading.com. Sep. 25, 2006, pp. 1.
"Reality Digital—Making Media Move", www.realitydigital.com, Nov. 28, 2006, pp. 1-2.
Nedos, A; Singh K., Clarke S, Proximity Based Group Communications for Mobile Ad Hoc Networks : Proximity-Based Group Communication; Global Smart Spaces; D.14; Oct. 3, 2003; 31 pages.
Backstrom et al., Spatial Variation in Search Engine Queries, WWW•2008, Beijing, China (Apr. 21-25, 2008). 10 pages.
Gan et al., Analysis of Geographic Queries in a Search Engine Log, LocWeb 2008, Beijing, China (Apr. 22, 2008). 8 pages.
International Search Report and Written Opinion (PCT/US2009/060476) dated May 4, 2010; 12 pages.
International Search Report and Written Opinion (PCT/US2009/060374) dated Apr. 30, 2010; 12 pages.
International Search Report (PCT/US2009/060379) dated April 30, 2010; 3 pages.
International Search Report and Written Opinion (PCT/US2008/085135) dated May 25, 2009; 7 pages.
International Search Report (PCT/US2009/055503) dated Apr. 8, 2010; 3 pages.
Written Opinion (PCT/US2008/085915) dated Jun. 29, 2009; 4 pages.
Written Opinion (PCT/US2008/086948) dated May 21, 2009; 5 pages.
International Search Report and Written Opinion (PCT/US2009/051247) dated Jan. 25, 2010; 9 pages.
International Search Report and Written Opinion (PCT/US2009/046258) dated Dec. 23, 2009; 7 pages.
International Preliminary Report on Patentability (PCT/US2007/084807) dated May 26, 2009; 5 pages.
International Search Report (PCT/US2010/026063) dated May 27, 2008; 3 pages.
Davis. M. et al. (Apr. 2-7, 2005). "MMM2: Mobile Media Metadata for Media Sharing," CHI 2005 Portland, Oregon. 4 pages.
International Search Report (PCT/US2009/0903045) dated Sep. 23, 2000, 2 pages.
International Search Report (PCT/US2008/088228) dated Sep. 30, 2009; 2 pages.
Written Opinion (PCT/US2008/088228) dated Sep. 30, 2009; 5 pages.
International Search Report (PCT/US2009/030406) dated Sep. 29, 2009; 5 pages.
International Search Report and Written Opinion (PCT/US2009/034445) dated Oct. 12, 2009; 7 pages.

International Search Report (PCT/US2009/034444) dated Sep. 18, 2009; 2 pages.

Kaasinen, E., "Behavior & Information Technology", Taylor & Francis, vol. 24, No. 1, Jan./Feb. 2005, pp. 1-2, (Abstract only attached).

Perkowitz, Mike et al., "Utilizing Online Communities to Facilitate Physical World Interactions", The International Conference on Communities and Technologies, Sep. 19, 2003, Amsterdam, pp. 116-121.

* cited by examiner

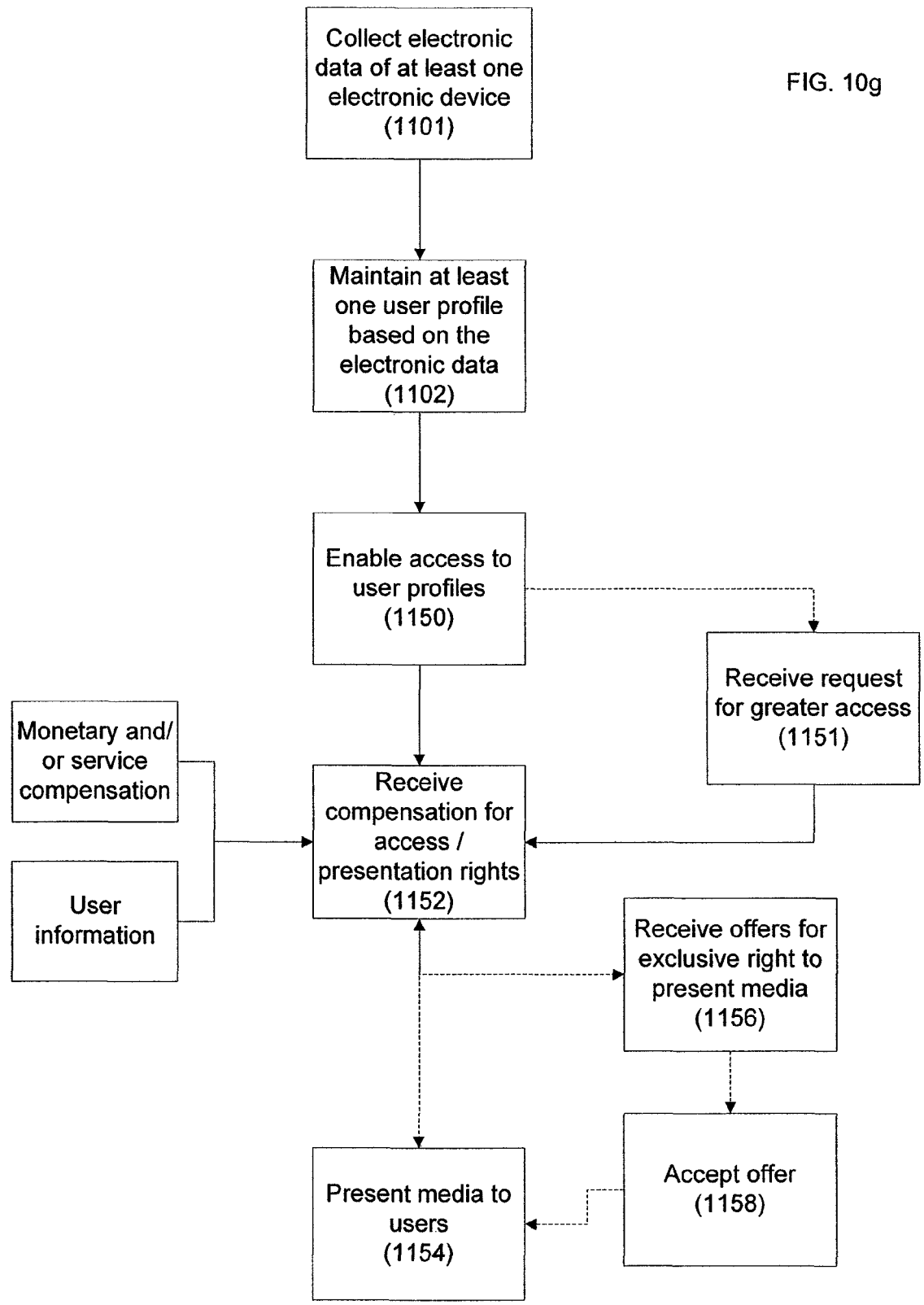

METHODS, SYSTEMS AND APPARATUS FOR DELIVERY OF MEDIA

FIELD OF THE INVENTION

This invention relates to methods, systems and apparatus for delivery of media. In one embodiment, a user profile is maintained and media is delivered to a mobile electronic device associated with the user profile.

BACKGROUND OF THE INVENTION

A great deal of information is generated when people use electronic devices, such as when people use mobile phones and cable set-top boxes. Such information, such as location, applications used, social network, physical and online locations visited, to name a few, could be used to deliver useful services and information to end users, and provide commercial opportunities to advertisers and retailers. However, most of this information is effectively abandoned due to deficiencies in the way such information may be captured. For example, and with respect to a mobile phone, information is generally not gathered while the mobile phone is idle (i.e., not being used by a user). Other information, such as presence of others in the immediate vicinity, time and frequency of messages to other users, and activities of a user's social network is also not captured effectively. There exists a need for methods, systems and apparatus to collect and communicate data associated with users and their electronic devices.

SUMMARIES OF THE INVENTION

Systems, methods and apparatus for collecting data and presenting media based thereon are provided. The systems generally include a data gathering module associated with an electronic device. The data gathering module communicates gathered data to a management module, which manages at least one user profile based on the gathered data. The management module may select media for presentation to a user based on the user profile, and the selected media may be displayed to the user via a media output device co-located with the user, such as a display of the user's mobile electronic device or a billboard or other display co-located with the user.

In one aspect, systems for selecting media for presentation to a media output device are provided. In one embodiment, a system comprises a data gathering module, a profile management module, a user profile and a media presentation module. The data gathering module is associated with an electronic device and gathers electronic device data of the electronic device. The profile management module receives the electronic device data and manages a user profile based thereon. The user profile is associated with a user of the electronic device and includes at least some of the electronic device data. The media presentation module receives at least a portion of the user profile and facilitates presentation of selected media to a media output device associated with the user. The media selected by the media presentation module is selected, at least in part, based at least in part on the user profile. In one approach, the electronic device data includes at least one of spatial data, temporal data, and interaction data. In one embodiment the electronic device data includes at least two of spatial data, temporal data, and interaction data or subsets thereof, and, in a particular embodiment, the electronic device data includes at least two of spatial data, temporal data, and interaction data. In one approach, the interaction data includes at least one of interpersonal communication data, media data, relationship data, transaction data, device interaction data and subsets thereof. In one approach the interaction data includes at least two of interpersonal communication data, media data, relationship data, transaction data, device interaction data and subsets thereof. In one approach, the relationship data includes at least one of social network data and user identity data. The user profile comprises at least some of the electronic device data, and in a particular embodiment includes deduced information that is deduced based on at least one of the spatial data, the temporal data, and the interaction data. In this regard, the profile management module may correlate one or more of the spatial data, the temporal data, and the interaction data to deduce at least some of the deduced information. Thus, the user profile may include at least one of past location data, present location data, and predicted future location data. The user profile may include past activity information, present activity information, predicted future activity information, and preferences information. In a particular approach, the user profile is one of a plurality of user profiles and the profile management module manages the plurality of user profiles, where at least some of the deduced information is deduced based at least on a comparison of two or more of the plurality of user profiles. In one embodiment, each of the plurality of user profiles is associated with an electronic device and the media presentation module selects media for presentation to at least one of the electronic devices based at least on a comparison of two or more of the plurality of user profiles.

In another aspect, the systems may include an authenticator for receiving and authenticating third party data received from at least one third party. Thus, the profile management module may receive the electronic device data and the third party data, manage a user profile associated with a user, where the user profile includes at least some of the electronic device data and the third party data. In one embodiment, the user profile comprises deduced information that is deduced based on the electronic device data and the third party data. Thus, the profile management module may correlate one or more of the electronic device data and the third party data to deduce at least some of the deduced information.

In another aspect, methods for selecting media for presentation to a media output device are provided. In one embodiment, a method includes the steps of collecting data, maintaining user profiles based on the collected data, selecting media from a media inventory, selecting a media output device, and causing delivery of the selected media. The collecting data step generally includes collecting at least two of spatial data, temporal data and interaction data from a plurality of electronic devices. The interaction data generally includes at least one of interpersonal communication data, media data, relationship data, transaction data and electronic device interaction data. In one approach, the collected data is uniquely identified via a unique identifier, such as via a unique identifier utilized with data collecting modules resident on the electronic devices, or via a phone number associated with the electronic devices. The step of maintaining user profiles generally includes maintaining a plurality of user profiles based on at least one of temporal data, spatial data, and interaction data. In one approach, at least one unique identifier is utilized to facilitate user profile identification and maintenance. In one embodiment, the user profiles include at least some of the collected data. In one approach, the maintaining step comprises correlating data from at least one of the temporal data, spatial data and interaction data to generate deduced information. At least some of the deduced information may be included in one or more of the user profiles. The step of selecting media from a media inventory is generally based at least in part on one user profile. In one approach, the selecting step comprises comparing at least a portion of the user profile (e.g., current location data) to media of a media inventory and selecting at least one targeted media for delivery. The step of selecting a media output device via which to deliver the selected media generally comprises comparing the location of a user (e.g., the location of a user associated with a user profile) to media output devices proximal the user, and selecting one or more media output devices co-located with the user. In one embodiment, the media output device is a mobile electronic device of the user. In another embodiment, the media output device is a display co-located with the user, such as a billboard, a computer or a television. In another embodiment, the media output device is a device associated with the third party, such a business or government entity. The causing delivery step is generally accomplished by transforming the media to conform to the selected media output device(s) and transmitting the selected media to the selected media output device(s).

In a related aspect, the method may include the step of receiving third party data from at least one third party, the third party data including at least one of temporal data, spatial data and interaction data and authenticating at least one of the electronic device data and the third party data. In one embodiment, the authenticating step may include the steps of comparing a third party certificate to authenticating information and allowing use of the third party data for the maintaining step. In another embodiment, the authenticating step may include the steps of comparing the third party data to preexisting data of the user profiles, determining whether the third party data satisfies a predetermined number of authenticating criteria, and allowing use of the third party data for the maintaining step. Thus, the method may also include the step of correlating at least one of the electronic device data and the third party data to produce deduced information.

In another aspect, methods of facilitating collection of electronic data are provided. In one embodiment, a method includes the steps of associating a data gathering module with an electronic device, collecting interaction data via the data gathering module, compensating a user based on the collecting interaction data step, and maintaining a user profile based at least in part on the interaction data. The compensating step may include compensating the user for facilitating the collection of the interaction data in return for an agreement by the user to allow the collected interaction data to be utilized to maintain a user profile and/or for an agreement by the user to allow the collected interaction data to be shared with third parties and/or for an agreement by the user to allow the presentation of media to the user. In one approach, discounted services and/or discounted merchandise are provided as at least part of the compensation to the user. In one embodiment, the method includes the step of enabling the user to select one of the data collection levels (e.g., the amount of interaction data, spatial data and/or temporal data collected) and/or the data sharing levels (e.g., with whom the collected data is shared and to what degree the collected data is shared). The method may thus include the step of compensating the user with compensation in proportion to the data collection levels and/or the data sharing levels. In this regard, the method may include the step of selecting a first data collection level for a first type of data and may include the step of selecting a second data collection level for a second type of data. The method may include the step of selecting a first sharing level for the first data type and the may include the step of selecting a second sharing level for the second type of data. One or more of these selecting steps may be facilitated via a data gathering module or a component thereof or related thereto.

In this regard, in one embodiment, the user may accomplish one or more of these selecting steps. The first and second types of data may be any one of the spatial data, temporal data and interaction data and any subset thereof. In one embodiment, the first type of data includes data from at least two of the spatial data, temporal data and interaction data. In one embodiment, the second type of data is data not included with the first type of data. The first and second sharing levels may relate to one or more of data shared with various entities, such as businesses, governmental entities and relations, such as personal relations. In one approach, the first sharing level may allow for sharing of the first type of data with a first entity and the second sharing level allows for sharing of the second type of data with a second entity. In a particular embodiment, the first and second types of data may include at least some common data, and this common data may be shared with the first entity but is not shared with the second entity. In one embodiment, the method includes the step of compensating the user at a first compensation rate relative to the first data collection level and/or the first sharing level. The method may include the step of compensating the user at a second compensation rate relative to the second data collection level and/or the second sharing level.

In another aspect, methods for maintaining a plurality of user profiles and receiving compensation therefore are provided. In one embodiment, a method comprises collecting electronic data from a plurality of mobile electronic devices, maintaining a plurality of user profiles, each of the user profiles being associated with at least one mobile electronic devices, enabling access, by one or more vendors, to at least a portion of the user profile information for at least some of the plurality of user profiles, and receiving compensation from the one or more vendors for the enabling access step. The method of may include enabling access to a first tier of the user profile and receiving compensation step comprises receiving compensation at a first level. The method may also include the step of enabling access to a second tier of the user profile and receiving compensation step comprises receiving compensation at a second level, which may be higher than the first tier level of compensation. In one embodiment, a request for access to the second tier of the user profile may be received, and access to the second tier may concomitantly or subsequently enabled. In another approach, at least a portion of a first one of the plurality of user profiles is resident on a mobile electronic device and is associated with a first user. In this approach, access to at least a portion of the first user's profile may be facilitated by the first user, and at least a portion of the compensation may be provided to the first user for facilitating access to the profile. In another approach, the method may include receiving, from the one or more vendors, offers for a right to present media to a first user, accepting one of the offers, and enabling the presentation of media to the first user.

In another aspect, methods for facilitating collection of information associated with a mobile electronic device are provided. In one embodiment, a method comprises collecting electronic device data via one or more operational modules resident on a mobile electronic device, providing collected electronic data to a data gathering module resident on the mobile electronic device, and compensating a third party for the providing step. The method may also include the steps of maintaining a user profile based on the collected electronic data, enabling access, by one or more vendors, to at least a portion of the user profile; and receiving vendor compensation from the one or more vendors for the enabling step. In one approach, the compensating step may include at least a portion of the vendor compensation to the third party. In this approach, the user profile may include first information and second information, the first information being based on data collected by a first operational module of the mobile electronic device, the first operational module being associated with a first party, the second information being based on data collected by a second operational module of the mobile electronic device, the second operational module being associated with a second party. The method may thus include the step of compensating the first party at a first compensation rate, the first compensation rate being related to the amount of data provided to the data gathering module by the first operational module. The method may further include the step of compensating the second party at a second compensation rate, the second compensation rate being related to the amount of data provided by the second operational module to the data gathering module. In this approach, the first compensation rate may be related to a ratio of the first information to total information of the user profile, and the second compensation rate may be related to a ratio of the second information to the total information of the user profile.

In another aspect, methods for facilitating collection of user information are provided. In one embodiment, the method may comprise maintaining a plurality of user profiles, each of the profiles being associated with a user of a mobile electronic device, collecting, via a first mobile electronic device associated with a first user, other user data, the other user data being associated with at least one or more others users of the mobile electronic devices, not including the first user, providing the other user data to a maintainer of the plurality of user profiles, and compensating the first user for at least one of the collecting the other user data step and the providing the other user data step. In one approach, the method may include the steps of enabling access, by the first user, to at least a portion of the user profile information of other users, allowing the first user to update the user profile information of the other users, and compensating the first user for updating the user profile information of the other users.

In another aspect, methods for presenting a media display opportunity are provided. In one embodiment a method includes the steps of collecting electronic data from a plurality of electronic devices, each of the electronic devices being associated with a user, maintaining a plurality of user profiles for each user of the electronic devices, each of the user profiles comprising user profile information that is based on collected electronic data, reviewing the plurality of user profiles, locating one or more media display opportunities based on the reviewing step, and presenting the media display opportunity to at least one vendor. In one approach, the method includes the steps of receiving one or more offers from at least one vendor for a right to present media, accepting at least one offer from at least one vendor, and causing presentation of media to at least one media output device co-located with a user, where the media is related to the vendor(s) whose offer(s) was/were selected, and where the user is associated with one of the plurality of user profiles. In one approach, the reviewing the plurality of user profiles step includes the steps of correlating the electronic data of the plurality of user profiles to metadata associated with media of a media inventory and selecting at least one user profile based on the correlation. In one approach, the media display opportunity comprises information relating to at least one of the user's current location, the user's predicted future location, the user's predicted future activities, and the user's preferences. In one approach, the method includes the steps of determining that at least one user is co-located with the at least one vendor and, after or concomitant to the determining step, completing the reviewing, locating and presenting steps.

As may be appreciated, various ones of the inventive aspects, approaches and embodiments described above may be combined to yield various systems and methods for presenting media. Furthermore, these and other aspects, advantages, and novel features of the invention are set forth in part in the description that follows and will become apparent to those skilled in the art upon examination of the following description and figures, or may be learned by practicing the invention.

BRIEF DESCRIPTION OF THE DRAWINGS

FIG. 10g is a block diagram illustrating one embodiment of a method for receiving compensation by enabling access to user profiles.

DETAILED DESCRIPTION OF THE INVENTION

Reference will now be made in detail to the accompanying drawings, which at least assist in illustrating various pertinent embodiments of the present invention.

Figure 1:
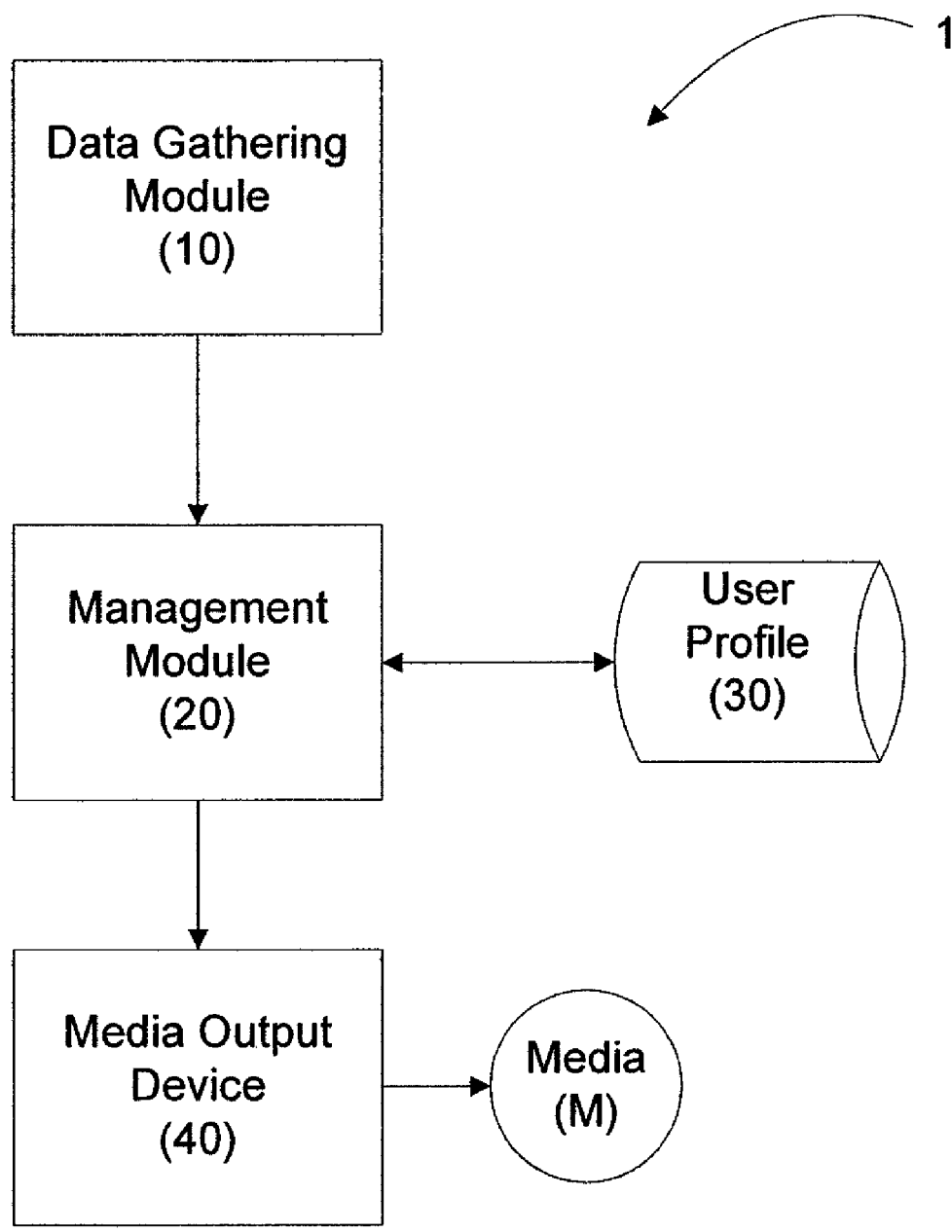
FIG. 1 is a schematic view illustrating one embodiment of a media delivery system.

FIG. 1 illustrates one embodiment of a system for delivering media. The system 1 includes a data gathering module 10, a management module 20, a user profile 30, and a media output device 40. The data gathering module 10 collects electronic data, communicates with the management module 20, and provides the electronic data to the management module 20. The management module 20 receives the electronic data from the data gathering module 10 and manages a user profile 30. As discussed in further detail below, the user profile 30 generally includes at least some of the collected electronic data. The management module 20 also communicates with the media output device 40, which is capable of outputting selected media (M) (e.g., a visual and/or audio message) for consumption by a user (e.g., for viewing and/or hearing).

The data gathering module 10 gathers electronic data, generally by being resident on an electronic device. As discussed in further detail below, the data gathering module 10 may interface with various other modules of the electronic device to collect data associated with the electronic device. For example, the data gathering module 10 may actively and/or passively gather electronic data associated with use of the electronic device. One example of actively gathered data includes data gathered due to interaction between a user and the electronic device, referred to herein as interaction data. One example of passively gathered data includes data gathered irrespective of user interaction with the electronic device. For example, spatial data and/or temporal data may be passively collected during transport of a mobile electronic device, such as a mobile phone.

Figure 2:
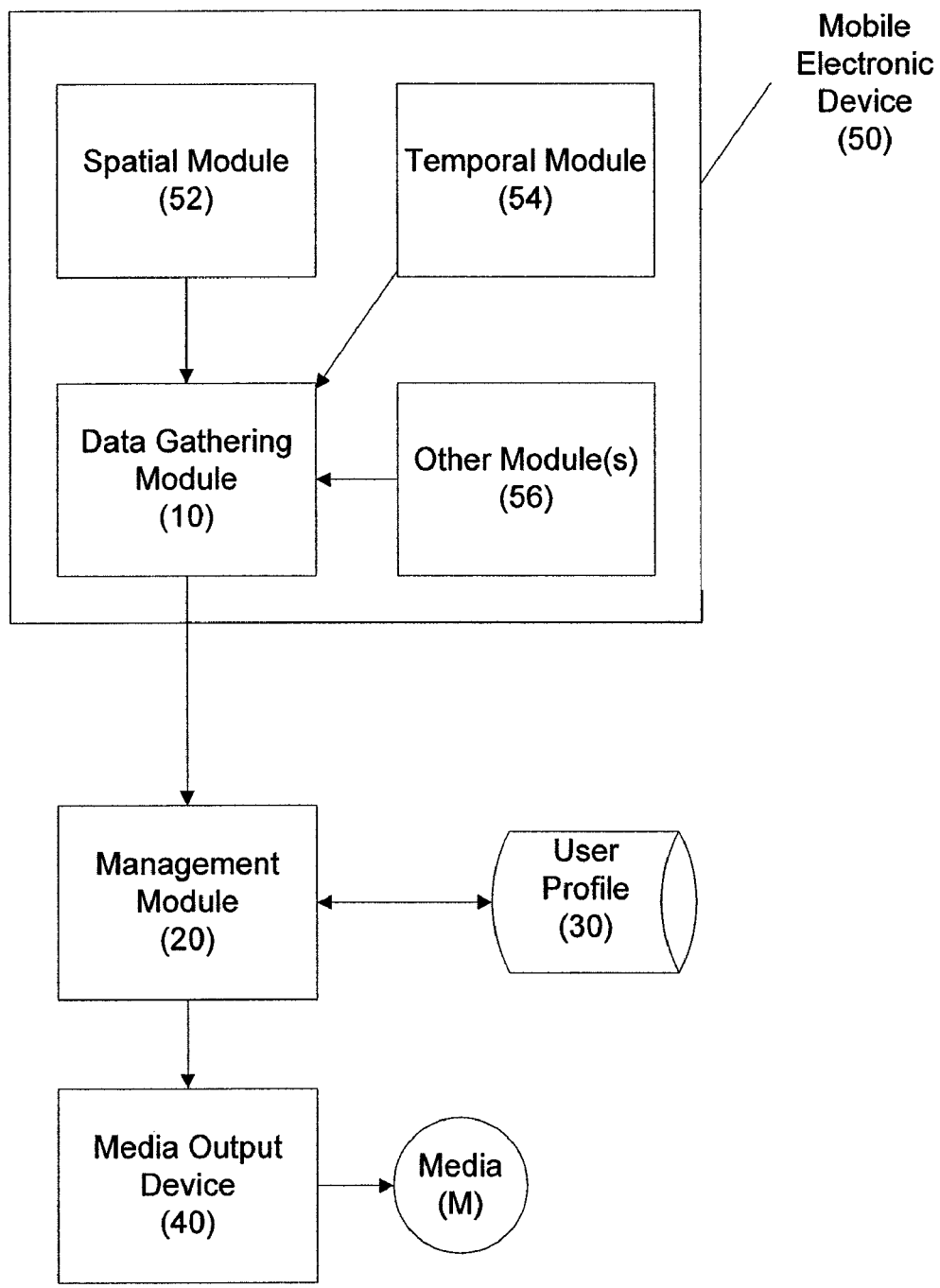
FIG. 2 is a schematic view illustrating one embodiment of a mobile electronic device including a data gathering module of FIG. 1.

One embodiment of an electronic device including a data gathering module is illustrated in FIG. 2. In this embodiment, the electronic device is a mobile electronic device 50, such as a mobile phone, a mobile email device, a mobile portable digital assistant, or a laptop computer, to name a few. The mobile electronic device 50 includes a spatial module 52, a temporal module 54, and one or more other module(s) 56 that may communicate with the data gathering module 10. The spatial module 52, temporal module 54 and other module(s) 56 may be pre-existing components of the mobile electronic device. The data gathering module 10 may interface with these modules (e.g., via an application program interface) to facilitate the communication. The spatial module 52 may communicate spatial data to the data gathering module 10, the temporal module 54 may communicate temporal data to the data gathering module 10, and the other module(s) 56 may communicate other data, such as interaction data to the data gathering module 10. As discussed in further detail below, any one of the spatial module 52, temporal module 54 and/or other module(s) may be integrated with the data gathering module 10.

One notable aspect of this embodiment is that the data gathering module 10 may communicate with the spatial module 52, the temporal module 54, and/or the other module(s) 56, irrespective of whether the mobile electronic device 50 is being used by the user and/or irrespective of whether the mobile electronic device 50 is in communication with a network. Thus, the data gathering module 10 may collect a plurality of types of data of the mobile electronic device 50, irrespective of user interaction with the device and irrespective of whether the mobile electronic device 50 is in communication with the network. Thus, substantial amounts of spatial, temporal and other data may be collected and later communicated to the management module 20, thereby facilitating management and production of the user profile 30.

The spatial module 52 may be any hardware and/or software adapted to communicate spatial data. For example, the spatial module 52 may be a module operable to communicate location coordinates associated with the mobile electronic device 50. In one embodiment, the spatial module 52 may include general packet radio service (GPRS) hardware and/or software.

The temporal module 54 may be any hardware and/or software operable to communicate temporal data (e.g., time stamps). In one embodiment, the temporal module 54 utilizes a local clock to communicate the temporal data. In another embodiment, the temporal module 54 uses a network-based clock to communicate temporal data.

The other module(s) 56 may be any other hardware and/or software associated with the mobile electronic device 50, such as a communication module (e.g., a short message service (SMS), an email and/or a voice module), a media-related module (e.g., a word processor, an Internet browser, an audio playback module, and an imaging module, such as a photographic device), and the like.

The data gathering module 10 may be any hardware and/or software operable to gather data collected by the modules of the mobile electronic device 50. In one embodiment, the data gathering module 10 mainly comprises software operable to communicate with modules of the mobile electronic device 50 without requiring user interaction, and thus may act as a background agent of the mobile electronic device 50, gathering, in the background of operation of the mobile electronic device, data produced by the mobile electronic device 50.

The data gathering module 10 may be preloaded on and/or downloaded to the mobile electronic device 50 (e.g., such as via server or a peer-to-peer network). To facilitate collection of uniquely identifiable data, which may be used to maintain the user profile 30, each data gathering module 10 may comprise a unique identifier. This unique identifier may be used in conjunction with the collected data to facilitate identification of a unique user and maintenance of a unique user profile 30 based thereon.

As discussed in further detail below, the data gathering module 10 may be a separate module from any of the other modules of the system 1, or the data gathering module 10 may be integrated with one or more modules of the system 1. For example, and as discussed in further detail below, the data gathering module 10 may be integrated with the management module 20 to facilitate delivery of media to the media output device 40.

In another embodiment (not illustrated), the data gathering module 10 may be located on a non-mobile electronic device, such as a set-top box, a predominately stationary computer (e.g., a desktop computer or a server), an electronic vending device (e.g., a food and/or beverage dispensing machine), or an electronic billboard, to name a few. In this regard, the data gathering module 10 may interact with the modules of those devices similar to the interaction described above with respect to the mobile electronic device 50.

Figure 3:
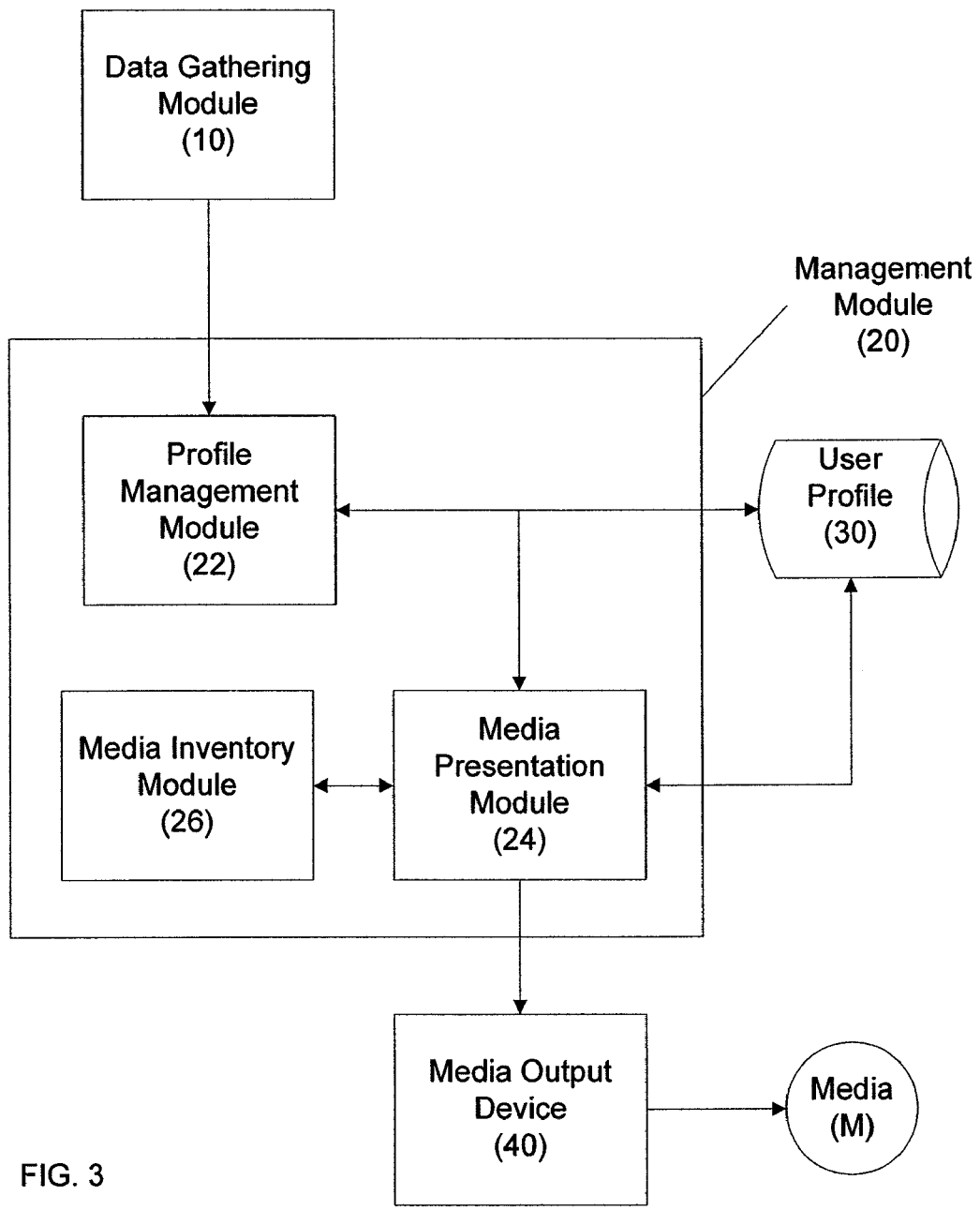
FIG. 3 is a schematic view illustrating one embodiment of a management module of FIG. 1.

As noted above, the management module 20 receives electronic data from the data gathering module (e.g., via wireless communication) and manages the user profile 30 (e.g., creates and/or updates the user profile 30). One embodiment of a management module 20 is illustrated in FIG. 3. In the illustrated embodiment, the management module 20 includes a profile management module 22, a media presentation module 24, and may optionally include a media inventory 26, which may comprise a database of media and metadata associated therewith. The profile management module 22 receives the electronic data from the data gathering module 10 and manages at least one user profile 30 based on the electronic data. For example, and as discussed in further detail below, the profile management module 22 may update the user profile 30 with the received data and/or may correlate the received data to deduce at least a portion of the user profile 30.

The media presentation module 24 utilizes at least a portion of the user profile 30 to facilitate selection of media for presentation to a user. In one approach, and as discussed in further detail below, the media presentation module 24 may correlate data of the user profile 30 and data associated with the media of the media inventory 26 to locate potential targeted advertising opportunities. In turn, the media presentation module 24 may present these opportunities to one or more third parties (e.g., one or more vendors), who may provide compensation for the right to present media to the users associated with selected user profiles. By way of illustration, the media presentation module 24 may review the user profiles to determine which users may have an interest in purchasing one or more goods or services. In turn, the media presentation module 24 may present a concomitant media display opportunity to one or more vendors, who may bid for the right to display targeted media to one or more of the users. For example, the media presentation module 24 may determine, based on the user profiles, that one or more users often purchase coffee on their way to work. In turn, the media presentation module 24 may notify one or more vendors (e.g., STARBUCKS, PEABODY COFFEE, PEET'S COFFEE) of the potential coffee advertising opportunity. Those vendors may then bid for the right to provide a context-based targeted media display opportunity to the user via the media output device 40. For example, the vendors may bid for the right to display a coffee advertisement or coupon to the users during the times that those users normally purchase coffee and with respect to locations that those users normally frequent, such as determined using one or more of spatial data, temporal data and interaction data. Upon receiving a winning bid, the media display module 24 may present the appropriate media for display via the media output device 40.

In another approach, and as discussed in further detail below, the media presentation module 24 may receive a request from one or more third parties to provide user profiles having certain demographic characteristics. The media presentation module 24 may filter the user profiles in accordance with the requested demographic characteristics, and, in turn, may provide at least a portion of those filtered user profiles to the third party for further processing. In one embodiment, the third party is a vendor who selects one or more user profiles to which to deliver targeted media. In a particular embodiment, the third party may compensate the maintainer of the user profiles in return for access to the user profiles and/or a right to present the targeted media.

Figure 4:
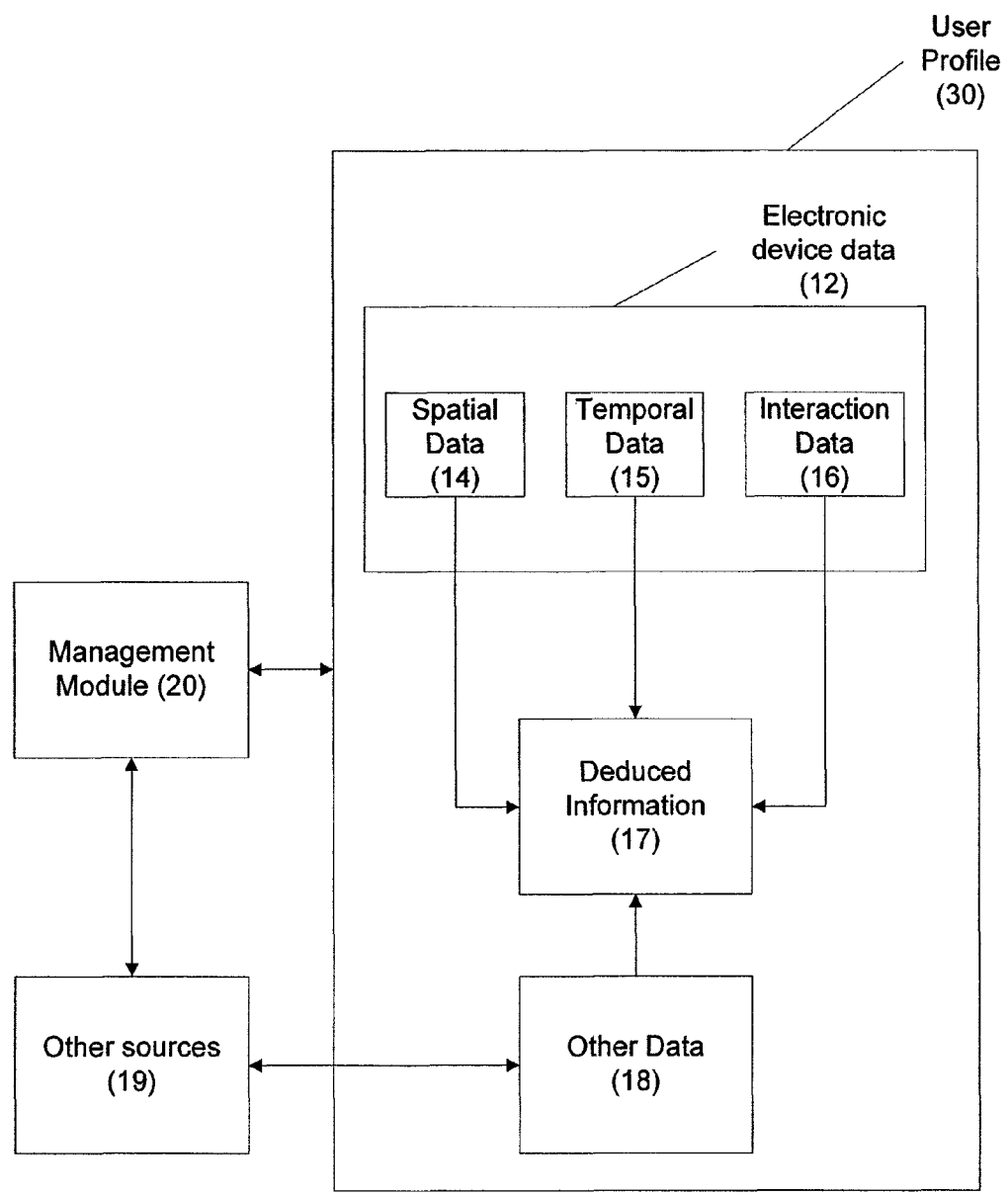
FIG. 4 is a schematic view illustrating one embodiment of a user profile of FIG. 1.

As noted, the profile management module 22 receives electronic data from the data gathering module 10 and manages the user profile 30. One embodiment of a user profile 30 is illustrated in FIG. 4. In the illustrated embodiment, the user profile 30 includes at least a portion of the electronic device data 12, which generally includes spatial data 14, temporal data 15, and interaction data 16. The user profile 30 may also optionally include, and generally does include, deduced information 17. The deduced information 17 is information that may be deduced based on at least one of the spatial data 14, the temporal data 15, and the interaction data 16. For example, and as discussed in further detail below, the profile management module 22 may correlate data of the spatial data 14, the temporal data 15 and/or the interaction data 16 to deduce the deduced information. By way of illustration, and as discussed in further detail below, the profile management module 22 may correlate temporal data (e.g., time of day) with spatial data (e.g., location) to determine a primary user location (e.g., a residence) and/or a secondary user location (e.g., a work location or a school location).

The spatial data 14 may be any data associated with a location of the user and/or an electronic device. For example, the spatial data 14 may include any passively collected location data, such as cell tower data, GPRS data, global positioning service (GPS) data, WI-FI data, personal area network data, IP address data and data from other network access points, or actively collected location data, such as location data entered by the user. The spatial data 14 may also include weather data associated with various locations.

The temporal data 15 is time based data (e.g., time stamps) that relate to specific times and/or events associated with a user and/or the electronic device. For example, the temporal data 15 may be passively collected time data (e.g., time data from a clock resident on the electronic device, or time data from a network clock), or the temporal data 15 may be actively collected time data, such as time data entered by the user of the electronic device (e.g., a user maintained calendar).

The interaction data 16 may be any data associated with user interaction of the electronic device, whether active or passive. Examples of interaction data 16 include interpersonal communication data, media data, relationship data, transactional data and device interaction data, all of which are described in further detail below. Table 1, below, is a non-exhaustive list including examples of electronic data.

TABLE 1

Examples of Electronic Data

| Spatial Data | Temporal Data | Interaction Data |
|---|---|---|
| Cell tower data | Time stamps | Interpersonal |
| GPRS data | Local clock | communication data |
| GPS data | Network clock | Media data |
| WiFi data | User input of | Relationship data |
| Personal area network data | time data | Transactional data |
| Network access points data | | Device interaction data |
| User input of location data | | |
| Geo-coordinates data | | |

With respect to the interaction data 16, interpersonal communication data may include any data that is received from or sent by the electronic device and that is intended as a communication to or from the user. For example, the interpersonal communication data may be any data associated with an incoming or outgoing SMS message, email message, voice call (e.g., a cell phone call, a voice over IP call), or other type of interpersonal communication relative to the electronic device, such as information regarding who is sending and receiving the interpersonal communication(s). As described below, interpersonal communication data may be correlated with, for example, temporal data 15 to deduce information regarding frequency of communications, including concentrated communication patterns, which may indicate user activity information.

Media data may include any data relating to presentable media, such as audio data, visual data, and audiovisual data. For example, the audio data may be data relating to downloaded music, such as genre, artist, album and the like, and includes data regarding ringtones, ringbacks, media purchased, playlists, and media shared, to name a few. The visual data may be data relating to images and/or text received by the electronic device (e.g., via the Internet or other network). The visual data may be data relating to images and/or text sent from and/or captured at the electronic device. The audiovisual data may be data associated with any videos captured at, downloaded to, or otherwise associated with the electronic device. The media data includes media presented to the user via a network, such as use of the Internet, and includes data relating to text entered and/or received by the user using the network (e.g., search terms), and interaction with the network media, such as click data (e.g., advertisement banner clicks, bookmarks, click patterns and the like). Thus, the media data may include data relating to the user's RSS feeds, subscriptions, group memberships, game services, alerts, and the like. The media data also includes non-network activity, such as image capture and/or video capture using an electronic device, such as a mobile phone. The image data may include metadata added by the user, or other data associated with the image, such as, with respect to photos, location when the photos were taken, direction of the shot, content of the shot, and time of day, to name a few. As described in further detail below, media data may be used, for example, to deduce activities information or preferences information, such as cultural and/or buying preferences information.

The relationship data may include data relating to the relationships of the user of an electronic device. For example, the relationship data may include user identity data, such as gender, age, race, name, social security number, photographs and other information associated with the user's identity. User identity information may also include e-mail addresses, login names and passwords. The relationship data may also include social network data. Social network data includes data relating to any relation of the user of the electronic device that is input by the user, such as data relating to a user's friends, family, co-workers, business relations, and the like. Social network data may include, for example, data corresponding with a user-maintained electronic address book. Relationship data may be correlated with, for example, location data to deduce social network information, such as primary relationships (e.g., user-spouse, user-children and user-parent relationships) or other relationships (e.g., user-friends, user-co-worker, user-business associate relationships). Relationship data also may be utilized to deduce, for example, activities information.

The interaction data 16 may also include transactional data. The transactional data may be any data associated with commercial transactions undertaken by or at the mobile electronic device, such as vendor information, financial institution information (e.g., bank information), financial account information (e.g., credit card information), merchandise information and costs/prices information, and purchase frequency information, to name a few. The transactional data may be utilized, for example, to deduce activities and preferences information. The transactional information may also be used to deduce types of devices and/or services the user owns and/or in which the user may have an interest.

The interaction data 16 may also include device interaction data. Device interaction data may be any data relating to a user's interaction with the electronic device not included in any of the above categories, such as habitual patterns associated with use of an electronic device data of other modules/applications, such as data regarding which applications are used on the electronic device and how often and when those applications are used. As described in further detail below, device interaction data may be correlated with temporal data to deduce information regarding user activities and patterns associated therewith. Table 2, below, is a non-exhaustive list including examples of interaction data.

TABLE 2

| Examples of Interaction Data | |
| --- | --- |
| Type of Data | Example(s) |
| Interpersonal communication data | Text-based communications, such as SMS and e-mail<br>Audio-based communications, such as voice calls, voice notes, voice mail |

TABLE 2-continued

| Examples of Interaction Data | |
| --- | --- |
| Type of Data | Example(s) |
| Media data | Media-based communications, such as multimedia messaging service (MMS) communications<br>Unique identifiers associated with a communication, such as phone numbers, e-mail addresses, and network addresses<br>Audio data, such as music data (artist, genre, track, album, etc.)<br>Visual data, such as any text, images and video data, including Internet data, picture data, podcast data and playlist data<br>Network interaction data, such as click patterns and channel viewing patterns |
| Relationship data | User identifying information, such as name, age, gender, race, and social security number<br>Social network data |
| Transactional data | Vendors<br>Financial accounts, such as credit cards and banks data<br>Type of merchandise/services purchased<br>Cost of purchases<br>Inventory of purchases |
| Device interaction data | Any data not captured above dealing with user interaction of the device, such as patterns of use of the device, applications utilized, and so forth |

As noted above, the user profile 30 may include deduced information 17. The deduced information 17 may be deduced based on the electronic device data 12, such as deduced based on one or more of the spatial data 14, temporal data 15 and/or interaction data 16. The deduced information 17 may thus include information relating to deduced locations and/or deduced activities of the user. For example, the deduced information 17 may comprise one or more of a primary user location, secondary user location, past locations, present location, and predicted future location information. The deduced information 17 may include information deduced based on a correlation of spatial data 14 in conjunction with temporal data 15 to deduce such location data. By way of illustration, the data gathering module 10 may transmit spatial data 14 and/or temporal data 15 to the management module 20. The management module 20 may thus correlate the spatial data 14 and/or temporal data 15 to determine that a user of a mobile electronic device is often at one or more specific locations during certain hours of the day. In a particular embodiment, the management module 20 may correlate the spatial data 14 and temporal data 15 to determine a primary user location (e.g., home), a secondary location (e.g., school or work) and/or other locations.

The deduced information 17 may also include activity information, such as past activity information, present activity information, and predicted future activity information. In this regard, the past, present, or predicted future activity information may include information relating to past communications and/or co-locations with other users. By way of primary example, the profile management module 22 may correlate spatial data with temporal data 15 to determine a user's activities (e.g., work, recreation, and/or home activities). By way of secondary example, interaction data 16 (e.g., social network data) may be correlated to determine a user's activities and predicted future activities. Predicted future activity information may include various day-to-day activities of the user, and also may include search query predictions, likely user interface actions, such as likely clicks, likely text input, likely speech, and others. The predicted future activity information may also include likely recipients of communications and/or content creation information.

The deduced information 17 may also include preferences information. The preferences information may include cultural preferences and/or buying preferences information. The cultural preferences information may be any preferences information relating to the culture of the user, such as gender preferences, ethnicity preferences, religious preferences and/or artistic preferences, to name a few. The buying preferences may be any preferences associated with the buying habits of the user.

The deduced information 17 may also include social network information. The social network information may include past, current and suggested user-to-user relationships information (e.g., primary relationships). In this regard, the social network information may be deduced based on the interpersonal communication data and/or social network data. Social network information can also include saved proximity of others, which can provide the basis for peer-to-peer services, such as automatic comparison of preferences information, which may facilitate suggestion of activities or locations that users may commonly prefer.

The deduced information 17 may include information that overlaps with the electronic device data 12. For example, a user's social network may include data that is both received from the data gathering module 10 (e.g., user address book data) and also may include deduced information based on the electronic device data 12 (e.g., deduced relationship data due to multiple interpersonal communications with one or more other users).

Other data 18 may also be used to produce the deduced information 17. For example, data from other sources 19, such as other electronic devices, other user profiles and other software and/or hardware applications may be associated with the electronic device and this other data may be used to facilitate deduction of the deduced information 17. By way of illustration, the other data 18 may be data associated with the user profile 30, but captured from another electronic device, such as another mobile electronic device or another stationary electronic device. In one approach, the management module 20 may correlate unique identifiers of the other sources (e.g., a physical address, a phone number and/or a social security number) with unique identifiers of the user profile 30 to determine whether the other data 18 should be utilized with the user profile 30.

Figure 5:
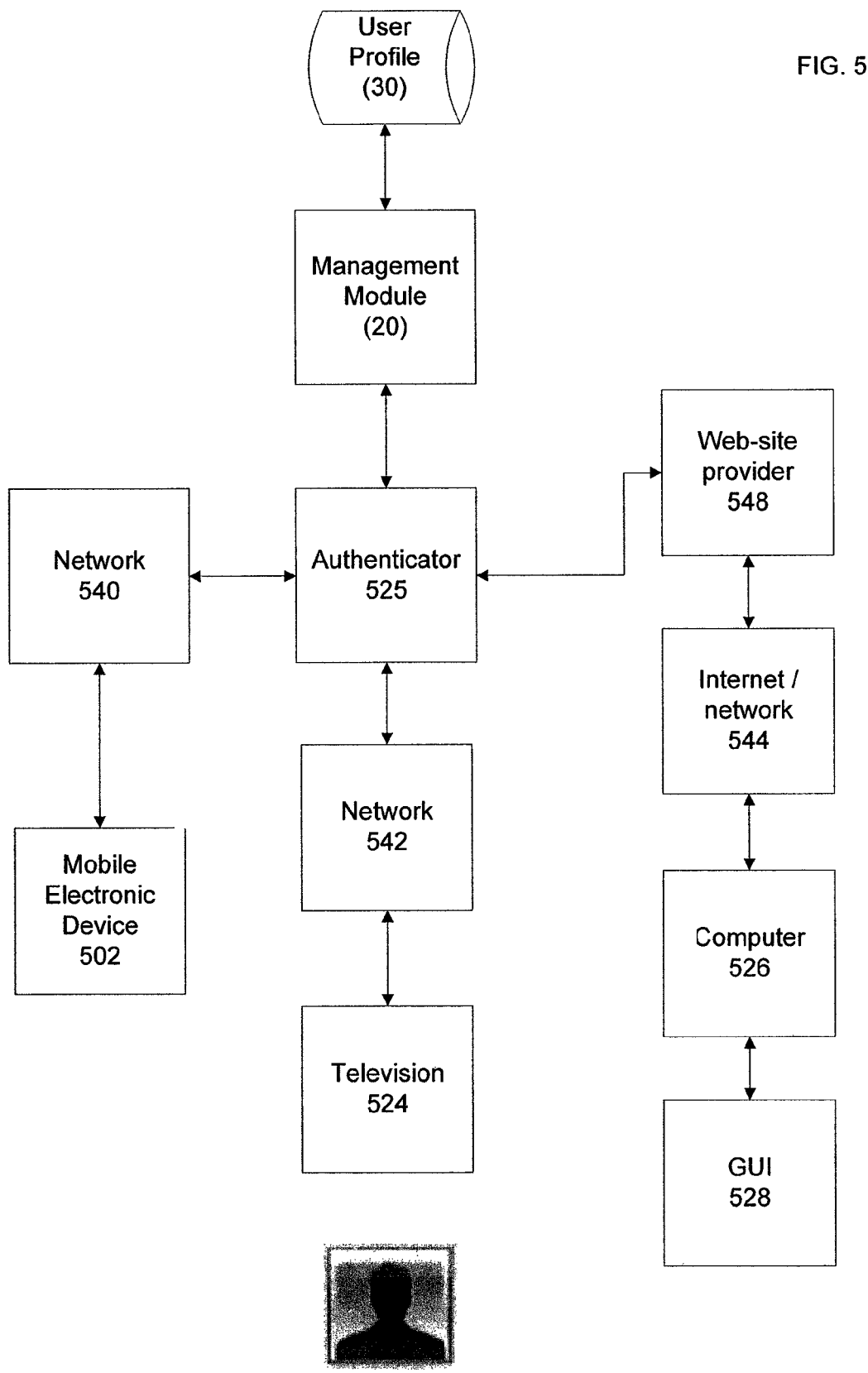
FIG. 5 is a schematic view illustrating one embodiment of data collection system useful with a media delivery system.

One embodiment of a system for collecting the other data 18 from other sources and for authenticating such collected other data 18 is illustrated in FIG. 5. In the illustrated embodiment, a management module 20, such as described above, manages a user profile 30 based on data about a user 500. As described above, the management module 20 may receive data from a mobile electronic device 502 via a network 540, such as via transmission of electronic device data to a maintainer of the user profile 30 via the Internet. The management module 20 may manage the user profile 30 based on such received data. In another approach, the data collected at the mobile electronic device 502 is passed to a mobile service provider (not illustrated), who receives the collected data and passes it to the management module 20 (e.g., via the Internet).

An authenticator 525 may be utilized to authenticate information received from a mobile electronic device 502 via the network 540. In this regard, the authenticator may compare information received from the mobile electronic device 502 (e.g., the phone number associated with the mobile electronic device 502) to authenticating information (e.g., user identity information, described above, such as a known phone number for user 500) to authenticate the received data and associate it with user 500. Once authenticated, the received data may be provided to the management module 20.

The authenticator 525 may be any suitable hardware and/or software that facilitates receipt of data and authentication of at least one of the data and the provider of the data. For example, the authenticator 525 may be a computerized device (e.g., an application server utilizing an application program interface (API)) capable of communicating with other computerized devices via the Internet. The authenticator 525 may be integrated with the management module 20, the data gathering module 10 and/or the user profile, or may be a separate component.

In a related approach, data from a business, such as a television subscription service (e.g., COMCAST) or another audio-visual viewing service (e.g., YOUTUBE.com), for viewing at a television 524 or similar display by the user 500 may be provided to the management module 20 via a network 542. For example, data relating to the user's viewing habits, current viewing activity and/or interaction with the viewing service may be provided to the management module 20 via the network 542 and the authenticator 525. In one approach, viewing data is collected by the viewing service provider and is provided to the management module 20 by the viewing service provider. In another approach, viewing data is collected directly by the management module 20 via the network 542 and authenticator 525, such as when the audio-visual services are provided via the Internet. The collected data may be authenticated via authenticator 525 to ensure that the received data is related to the user 500. For example, the authenticator may compare a signal address (e.g., an IP address or set-top box identifier) to authenticating information (e.g., a known IP address range or set-top box address of the user 500) to authenticate the received data and associate it with the user 500. Once authenticated, the data may be provided to the management module 20 for further processing.

In a further related approach, data from the user's interaction with a computerized device may be provided. For example, the user 500 may interact with various web-sites of the Internet 544 using a graphical user interface (GUI) 528 and a computer 526. The GUI 528 may comprise use of an Internet browser, such as FIREFOX and/or INTERNET EXPLORER, for instance. During interaction with a web-site, the user 500 may provide information that enables a web-site provider 548 (e.g., an on-line merchant) to authenticate the user, such as the user's name, physical address, IP address, transactional data (e.g. financial institution account information), a login/password system, a smart card, to name a few. The web-site provider 548 may also collect data about the user 500 while the user 500 utilizes the provider's web site 548, such as browsing habits and click data, to name two, and possibly information about the user's interaction with other sites (e.g., view review of cookies). For example, the web-site provider 548 may collect one or more of spatial data, location data, and interaction data, such as interpersonal communication data, media data, relationship data and/or transactional data. Since the user 500 has been identified, the collected data can be readily associated with the user 500 and thus may be utilized by the management module 20 to manage the user profile 30. Hence, the web-site provider 548 may provide such information to the management module 20 via the authenticator 525, such as via the Internet. The provided information may be authenticated by comparing at least some of the provided information (e.g., the physical address submitted by the user) to authenticating information (e.g., a known physical address for user 500) to authenticate the provided data. Once authenticated, the data may be provided to management module 20 for further processing. In another approach, the web-site provider 548 itself may be authenticated (e.g., via a digital certificate) and, once authenticated, information may be provided to the management module 20 for further review and processing. In one embodiment, information is provided in a structured manner to facilitate the management module's 20 review and management of the information. Thus, a user profile 30 may be readily updated using third party data without requiring a literal integration between the management module 20 and the third party.

In another approach, and with reference back to FIG. 4, a user may proactively update his/her user profile with the other data 18. In one embodiment, the other data is user profile data of another entity, such as a business entity that maintains its own user profile information. In another embodiment, the other data is data available from a public information source, such as government records and the like.

Table 3, below, is a non-exhaustive list including examples of deduced information and possible methods of deriving the deduced information.

TABLE 3

Examples of Deduced Information

| Type of Deduced Information | Primary Correlation(s) | Secondary Correlation(s) |
|---|---|---|
| Past location information | Spatial data | Temporal data<br>Interaction data<br>Any combination of spatial, temporal and interaction data<br>Use of other deduced information |
| Present location information | Spatial data | Temporal data<br>Interaction data<br>Any combination of spatial, temporal and interaction data<br>Use of other deduced information |
| Predicted future location information | Spatial + temporal data<br>Spatial + interaction data | Temporal data<br>Spatial data<br>Interaction data<br>Any combination of spatial, temporal and interaction data<br>Use of other deduced information |
| Past activity information | Spatial + temporal data<br>Spatial + interaction data | Temporal data<br>Spatial data<br>Interaction data<br>Any combination of spatial, temporal and interaction data<br>Use of other deduced information |
| Present activity information | Spatial + temporal data<br>Spatial + interaction data | Temporal data<br>Spatial data<br>Interaction data<br>Any combination of spatial, temporal and interaction data<br>Use of other deduced information |
| Predicted future activity information | Spatial + temporal data<br>Spatial + interaction data | Temporal data<br>Spatial data<br>Interaction data<br>Any combination of spatial, temporal and interaction data<br>Use of other deduced information |
| Preferences information | Spatial + temporal data<br>Interaction data<br>Interaction + temporal data<br>Interaction + spatial data<br>Interaction + spatial + temporal data | Temporal data<br>Spatial data<br>Use of other deduced information |
| Social network information | Interaction data<br>Interaction + spatial data | Temporal data<br>Spatial data<br>Any combination of spatial, temporal and interaction data<br>Use of other deduced information |

A primary correlation refers to a likely method of deducing the listed type of deduced information. A secondary correlation refers to other methods of deducing deduced information. For example, present location information will likely be deduced based on the spatial data, but could be deduced using interaction data (e.g., a calendar input by the user).

As noted above, the user profile 30 may include at least some electronic device data 12 and may also include deduced information 17. Since one or more of these data may be correlated due to the data capturing ability of the data gathering module 10, the user profile 30 may include a rich set of data, which can be broadly categorized as: past location information, present location information, predicted future location information, primary user location information, secondary user location information, tertiary user location information (and so on), past activities information, present activities information, predicted future activities information, preferences information (e.g., cultural and/or buying preferences information), and social network information (e.g., primary relationships, secondary relationships, and so on). These information categories are non-limiting and may overlap. For example, present activities information may include present location information. In another example, the social network information may assist with cultural preferences information (e.g., the user has many relations between the ages of 18 and 25, is primarily located in an urban area and thus may be amenable to a coupon to a dance club). In another example, the cultural preferences information may assist with buying preferences information (e.g., the user prefers Asian food and thus might be amenable to receipt of a coupon to an Asian restaurant).

Referring back to FIG. 3, as noted above, the media presentation module 24 facilitates selection of media for presentation to the media output device 40 based on the user profile 30. In one approach, the media presentation module 24 may compare media in the media inventory 26 to one or more user profiles, either by request or automatically. When the comparison justifies the presentation of the media, such as based on various economic and demographic factors, the media presentation module 24 may select the media for presentation via the media output device 40. In one approach, the media presentation module 24 may edit, compose, transform, reformat and/or transcode the media, to name a few, to correspond with the desired output parameters of the media output device 40. Thus, the media presentation module 24 may utilize at least a portion of the user profile 30 to facilitate selection of media for presentation to a media output device 40 associated with the user profile 30.

Any trigger may be utilized to initiate the selection of the media. For example, the media presentation module 24 may continuously correlate data of various user profiles to data associated with the media of the media inventory 26 to locate potential targeted advertising opportunities. In turn, the media presentation module 24 may present these opportunities to one or more third parties (e.g., one or more vendors), who may provide compensation for the right to present media to the users associated with selected user profiles. The trigger may be a given context trigger, such as a time trigger, an event trigger or place trigger, to name a few. The trigger may be a given content trigger, such as a trigger associated with clearing, accessing, viewing, editing and/or production of a given price of media. The trigger may be a social trigger, such as the co-location and/or communication with a given person or persons or type of person or persons. The trigger may be a commerce trigger, such as the occurrence of a specific type of commercial transaction. One or more of the above described triggers may be utilized, and in any combination, to trigger the comparison of the user profiles with the media inventory 26.

In another approach, the trigger may be a request from one or more third parties to provide user profiles having certain demographic characteristics. The media presentation module 24 may filter the user profiles in accordance with the requested demographic characteristics. In one embodiment, the media presentation module may utilize a pre-selected media and provide that media to one or more media output devices 40 associated with the filtered user profiles. In another embodiment, the media presentation module 24 may provide at least a portion of those filtered user profiles to the third party for further processing. In a related embodiment, the third party is a vendor who selects one or more user profiles to which to deliver targeted media, and in a particular embodiment, the third party may compensate the maintainer of the user profiles to present that targeted media.

In one embodiment, user attention to media is facilitated by automatically outputting media (e.g., factual media, such as current location, weather, time and the like) from time-to-time, such as by automatically displaying media, thereby possibly increasing the user's attentiveness to output media. This automatic output media may increase the likelihood that the user will be attentive to and consume (e.g., view and/or hear) other media, such as advertisements, coupons and the like. For example, media that includes periodic summaries (e.g., daily, weekly, hourly, etc.) of the user's activities may be provided to promote attentiveness to displayed or otherwise outputted media.

The media presentation module 24 may select media based on the electronic device data 12 and/or the deduced information 17. In one approach, a dynamic media display opportunity analysis is completed, wherein the media presentation module 24 correlates data of the user profile 30 and data associated with the media of the media inventory 26 to locate media display opportunities. In turn, the media presentation module 24 may present these opportunities to one or more third parties (e.g., one or more vendors), who may provide compensation for the right to present media to the users associated with selected user profiles.

In a related approach, the media presentation module may compare data of one or more user profiles to metadata of media within the media inventory 26 and selects appropriate media based thereon. For example, the media presentation module 24 may receive a plurality of user profiles and select those profiles related to females between the ages of 18 and 25 who have purchased songs in the R&B genre in the last 90 days. The media presentation module 24 may select media relating to a future R&B concert based on those user profiles and present that media to one or more of the users associated with the user profiles.

The media presentation module 24 may also facilitate tracking of user response to presented media. User response to presented media may be tracked via user response data, which may be categorized under interaction data, and this user response data may be provided to the profile management module 22 to facilitate updating the new profile 30 based thereon (e.g., updating the preferences information). The data gathering module 10 may also assist with or complete these functions.

The media presentation module 24 may format the media for any output device, such as a display, and in one embodiment the media may utilize a substantial portion of the display so as to better present the media. In this regard, the data gathering module 10 may facilitate the display of the media by overriding other display requirements.

The media presentation module 24 may include a transmission module (not illustrated) that transmits a selected media to the media output device 40. The transmission module may utilize any form of communication, known or developed, to transmit the media to the media output device 40.

The profile management module 22, the media presentation module 24 and/or the media inventory 26 may be distinct modules, such as separate software, and may be located at different locations. For example, a first server may include the profile management module 22 and a second server may include the media presentation module 24. The profile management module 22, the media presentation module 24 and/or the media inventory 26 may, alternatively, be co-located on a single electronic device, and in one embodiment may be integrated within that single electronic device (e.g., a mobile electronic device). In one embodiment, the media presentation module 24 and/or media inventory 26 may be co-located on the electronic device with the data gathering module 10, and the media presentation module 24 may cache the selected media to ensure media presentation to avoid a display latency penalty. As noted above, any of these modules may also be integrated with the data gathering module 10, such as when any one of the modules are an electronic device associated with the data gathering module 10.

With continued reference to FIG. 3, the media output device 40 communicates with the media presentation module 24 and outputs the selected media. The media may be audio, visual and/or audiovisual media, such as text, graphics, animation, or an audio message, to name a few, and may be interactive. The media may also include other sensory messages, such as vibrations, smells, tastes and the like. The media may include advertisements, coupons, and entertainment, to name a few.

The media output device 40 may be a display associated with the user profile 30, such as a display of a mobile electronic device or a similar device co-located with the user, such as a television, a computer, and a billboard, to name a few. The media output device 40 may automatically output (e.g., display) the selected media without user interaction. Thus, in one embodiment, no user interaction is required for output of the media (i.e., the media is displayed in the absence of user interaction with the media output device).

Figure 6A:
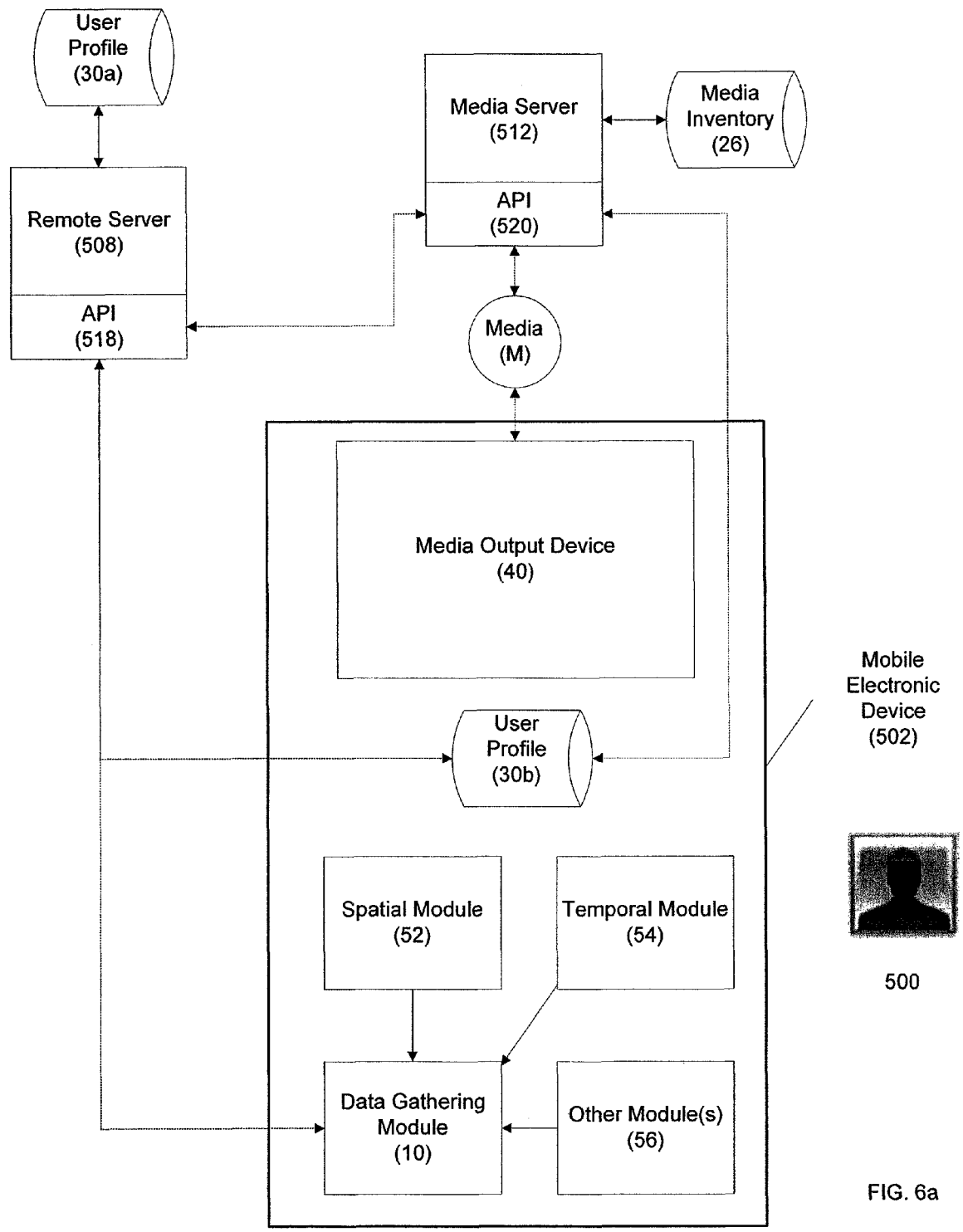
FIG. 6a is a schematic view illustrating one embodiment of a media delivery system utilizing a mobile electronic device.

Referring now to FIG. 6a, one embodiment of a system for delivering media to a mobile electronic device is illustrated. The system includes a mobile electronic device 502 (e.g., a mobile phone) that includes a data gathering module 10. The mobile electronic device 502 may communicate with a remote server 508, for example, via an application program interface ("API") 518. As described above, the data gathering module 10 may gather electronic device data associated with the mobile electronic device 502. In this regard, the data gathering module 10 may communicate with one or more modules of the mobile electronic device 502, such as a spatial module 52, a temporal module 54 or other module(s) 56. The mobile electronic device 502 may have a unique identifier, for example, a unique phone number or a uniquely identified data gathering module 10, which facilitates correlating the collected data to a user 500 of the mobile electronic device.

At predetermined intervals, or as requested by the remote server 508 or by the mobile electronic device 502, the data gathering module 10 may upload electronic device data to the remote server 508 for further processing. Thus, in the illustrated embodiment, the remote server 508 may act as a profile management module, as described above, and may maintain a user profile 30a associated with the user 500 of the mobile electronic device 502. As described above, this user profile 30a may include at least some of the electronic device data and may include deduced information.

The remote server 508 may communicate with a media server 512. In this regard, an API 518 may be utilized to facilitate communication between the remote server 508 and the media server 512. Thus, the remote server 508 is capable of providing at least a portion of the user profile 30a to the media server 512. The media server 512 may utilize at least a portion of the user profile 30a to facilitate selection of media from the media inventory 26. Thus, in the illustrated embodiment, the media server 512 may act as a media presentation module, as described above.

After receipt of at least a portion of the user profile 30a, the media server 512 may select one or more media from the media inventory 26 for presentation to the mobile electronic device 502. For example, the media server 512 may compare data associated with the user profile 30a to data associated with media of the media inventory 26 to facilitate selection of targeted media for delivery to the user 500 of the mobile electronic device 502. Upon selection of one or more targeted media from the media inventory 26, the media server 512 may facilitate presentation of targeted media to the mobile electronic device 502, such as via transmission to the mobile electronic device 502.

In a related embodiment, at least a portion of the user profile 30b may be located on the mobile electronic device 502 to facilitate direct presentation of targeted media to the mobile electronic device 502 via the media server 512. For example, when the mobile electronic device 502 is co-located with the media server 512, the media server 512 and/or mobile electronic device 502 may recognize such co-location (e.g., via a personal area network communication, such as BLUETOOTH communication). In turn, the media server 512 may receive at least a portion of the user profile 30b to facilitate selection of delivery of media to the mobile electronic device 502. As provided above, the media server 512 may utilize data of the user profile 30b to compare to media of the media inventory 514 and transmit appropriate targeted media to the mobile electronic device 502. For example, the media server 512 may communicate a targeted advertisement and/or targeted coupon to the mobile electronic device 502 based on at least a portion of the user profile 30b.

Figure 6B:
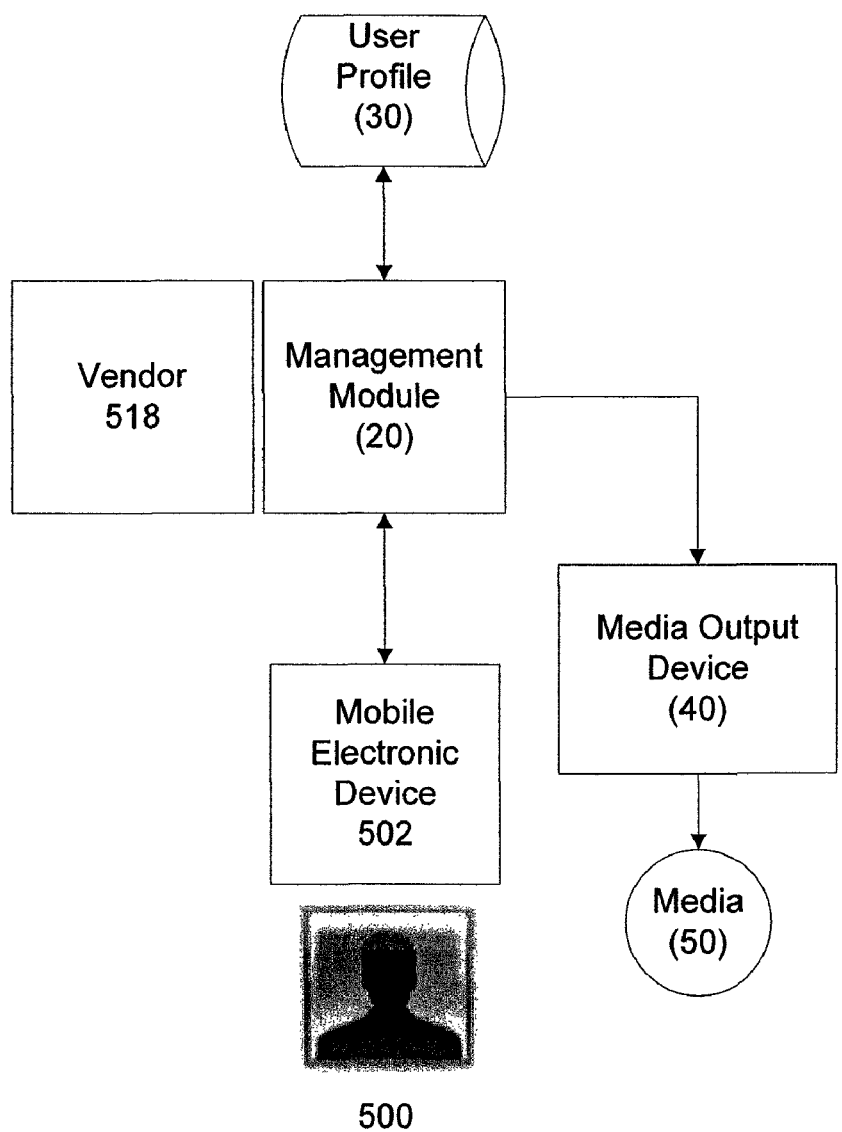
FIG. 6b is a schematic view illustrating one embodiment of a media delivery system utilizing a mobile electronic device.

In another related embodiment, and with reference to FIG. 6b, a user 500 associated with the mobile electronic device 502 may visit a vendor 518. Data gathered via the data gathering module (not illustrated) may be communicated to a management module 20 indicating that the user 500 is co-located with the vendor 518. The management module 20 may compare data of a user profile 30 that corresponds with the user 500 and may select appropriate targeted media for delivery to an media output device co-located with the user 500. For example, the media may be output to a display of the mobile electronic device 502. In another instance, the media may be presented to one or more other displays co-located with the user, such as a billboard, television, computer, and the like. The media may be, for example, an advertisement, a coupon, or other invitation to do business with the vendor 518. In the illustrated embodiment, the management module 20 is located proximal the vendor 518, such as on a server co-located with the vendor 518. However, the management module 20 may be located remote from the vendor 518. Also, portions of the management module 20 may be split and located at different locations. For example, a profile management module 22 may be located remote from the vendor 518, and a media presentation module 24 may be co-located with the vendor 518.

As described above, one or more of spatial data, temporal data, interaction data, and/or deduced information may be utilized to facilitate selection of media for delivery to the user 500 of the mobile electronic device 502. For example, spatial data may include current location data so that the media presentation module 24 may determine one or more vendors proximally located with the user 500 of the mobile electronic device 502. Temporal data may be utilized to indicate the time at which the user is proximal the vendors 518. Deduced information, such as past activity information, past location information, preferences information, and social network information may be utilized to facilitate selection of an appropriate media for presentation to the user 500 of the mobile electronic device 502. In one embodiment, cultural preferences and/or buying preferences information are utilized by the media presentation module 24 to facilitate presentation of media to the user 500 of the mobile electronic device 502. In another embodiment, relationship data, such as social network information, may be utilized to facilitate presentation of media to the user 500 of the mobile electronic device 502. For example, the media presentation module 24 may determine that two or more users are co-located (e.g., via current location data). In turn, the media presentation may compare the user profiles associated with each of the users and present media to one or more of the co-located users based thereon (e.g., based on advertisement). Many combinations of data are possible for producing deduced information and/or selecting media, and all such combinations are within the scope and spirit of the instant invention.

Figure 7:
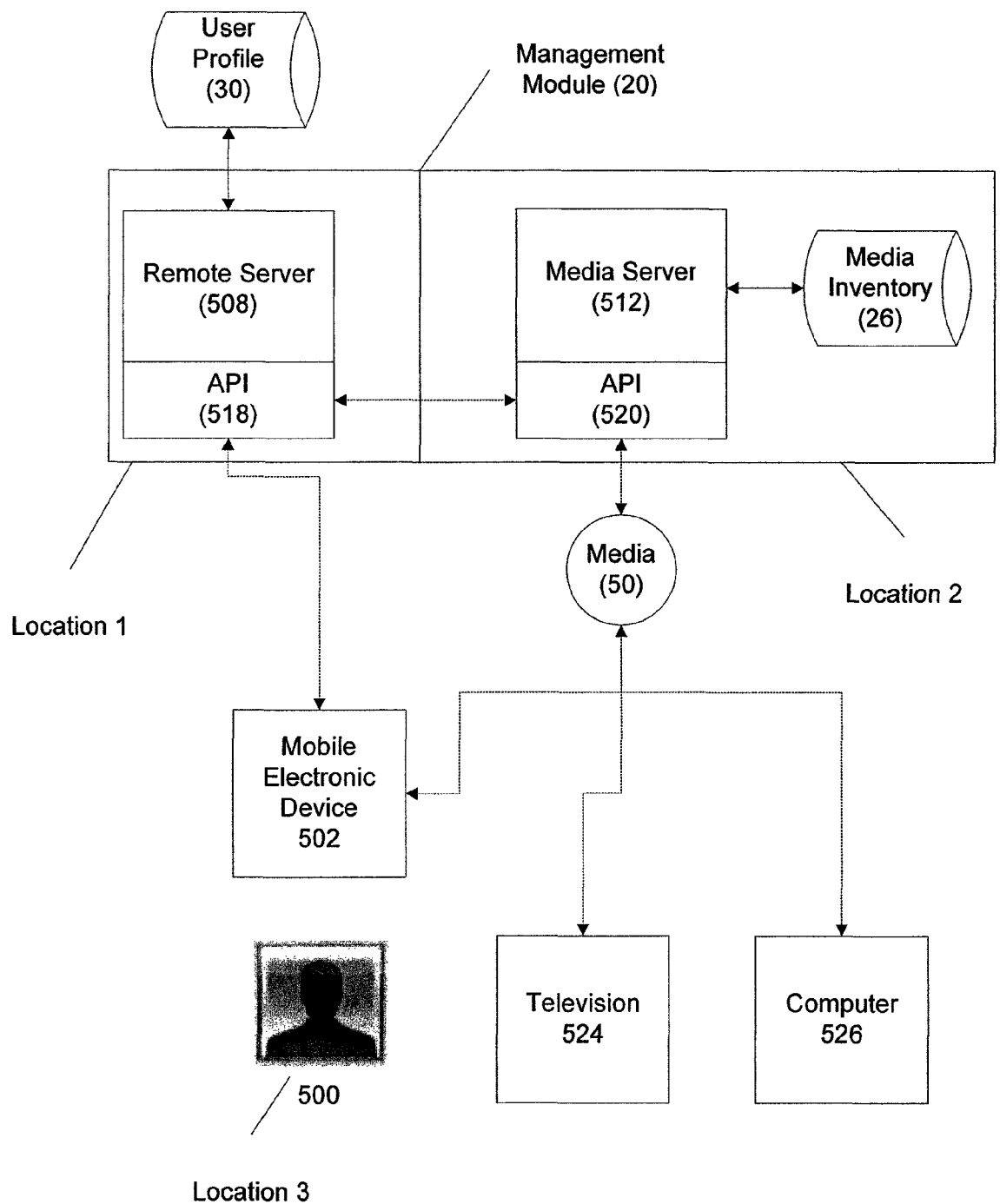
FIG. 7 is a schematic view illustrating one embodiment of a media delivery system utilizing a mobile electronic device.

The user profile 30 may be utilized to facilitate delivery of media to more than one electronic device. For example, and with reference to FIG. 7, a user 500 may be associated with a mobile electronic device 502. The user 500 may also be associated with one or more other electronic devices, such as a television 524 and/or a computer 526. In this regard, the management module 20 may be able to associate these other electronic devices with the user profile 30 via, for example, electronic data associated with such electronic devices (e.g., set-top box location information received from a business entity) and/or via deduction using electronic device data and/or other deduced information. In one instance, the user profile 30 may include primary location information, as described above, indicating that the user 500 is primarily located within a certain geographic vicinity. The management module 20 may receive data from other electronic devices and/or vendors associated with such electronic devices, indicating a similar geographical vicinity. Thus, the management module 20 may deduce that one or more of those electronic devices are associated with the user 500 of the mobile electronic device 502 and update the user profile 30 to indicate such.

In the illustrated embodiment, the management module 20 may determine a current location of the user 500, such as via spatial data (e.g., present location information) or deduced information (e.g., predicted future location information). Upon determining a likely location of the user 500, the management module 20 may select one or more electronic devices for delivery of media to the user 500. Upon selection of the electronic device(s), the management module 20 may utilize data associated with the user profile 30 to facilitate delivery of media to the selected device(s) for sensing by the user 500 (e.g., viewing and/or hearing of the media by the user).

By way of illustration, the management module 20 may determine that the user 500 is located at his/her primary location and may determine that the user 500 makes an interpersonal communication to a food vendor on this particular day of this week. Thus, the management module 20 may compare at least a portion of the user profile 30 to food-related media in the media inventory 26, and select one of those food-related media for presentation to the user 500, such as a coupon or advertisement of a food vendor proximal to the user's primary location. This media may be presented to one or more of the mobile electronic device 502, the television 524, and the computer 526, or any other electronic device co-located with the user at the primary location. In the illustrated embodiment, the management module 20 comprises a remote server 508 located at a first location and a media server 512 located at a second location, while the user 500 is at a third location. However, as described above, any of these modules may be co-located with one another, such as resident in the mobile electronic device 502 of the user 500.

As noted above, at least a portion of the user profile 30 may be located on the mobile electronic device 502 to facilitate delivery of media to the mobile electronic device 502. In addition, at least a portion of the management module 20 may also be located on the mobile electronic device 502 to facilitate presentation of the media. Thus, peer-to-peer media delivery may be facilitated.

Figure 8:
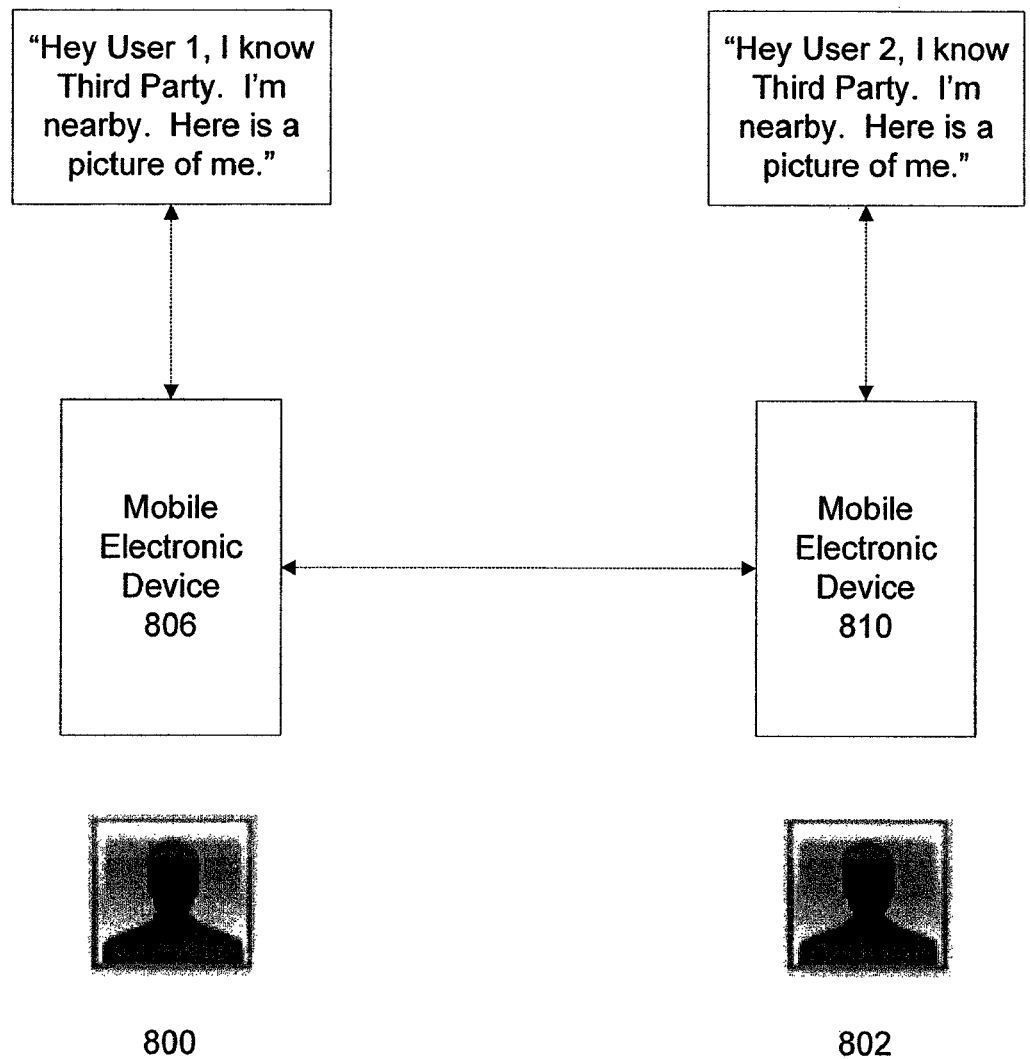
FIG. 8 is a schematic view illustrating one embodiment of a media delivery system employing a peer-to-peer network.

For example, and with reference to FIG. 8, a first mobile electronic device 806 may include a data gathering module (not illustrated) and may be associated with a first user 800. A second mobile electronic device 810 may also include a data gathering module (not illustrated) and may be associated with a second user 802. At least a portion of a management module (not illustrated) may be associated with each of the mobile electronic devices 806, 810. When the mobile electronic devices 806, 810 are co-located, the management modules of each of the devices 806, 810 may communicate with one another to facilitate presentation of selected media based on the user profiles of each of the mobile electronic devices 806, 810. For example, the management modules of each of the devices 806, 810 may share relationship data, such as social network data, to determine whether a common relationship is shared by the users 800, 802 of the mobile electronic devices 806, 810. If such a common relationship exists (e.g., both the users know or are acquainted with a third party), a message may be displayed via media output devices associated with the mobile electronic devices 806, 810 to communicate to each of the users 800, 802 that they have a common relationship. In the illustrated embodiment, messages are provided via displays of the media output devices of the mobile electronic devices 806, 810, indicating that the users 800, 802 have a common relationship and that the users 800, 802 are co-located with one another. An image of one user may also be provided to the other user.

Figure 9:
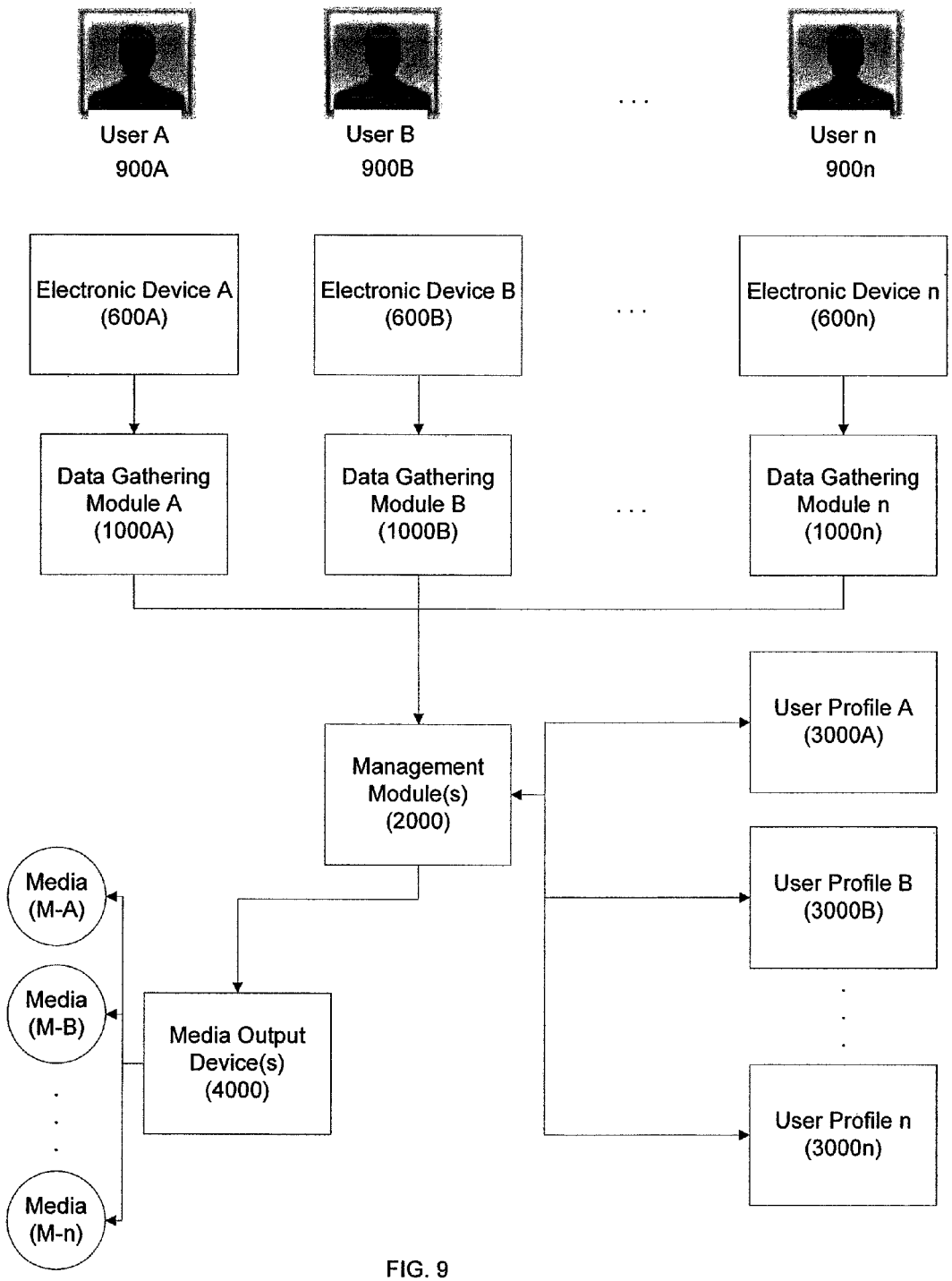
FIG. 9 is a schematic view illustrating one embodiment of a media delivery system for a plurality of users.

Referring now to FIG. 9, one embodiment of a system for collecting information about a plurality of users utilizing a plurality of electronic devices is provided. The system includes a plurality of electronic devices (600A, 600B through 600*n*), and a plurality of data gathering modules (1000A, 1000B through 1000*n*) associated with those electronic devices. As provided above, the data gathering modules (1000A, 1000B, through 1000*n*) may communicate data associated with each of a unique user (900A, 900B through 900*n*). The users (900A, 900B through 900*n*) may be uniquely identified via a unique identifier associated with each of the data gathering modules (1000A, 1000B through 1000*n*) and/or using a unique identifier, such as a phone number, social security number, address or other uniquely identifying characteristic. As described above, one or more management modules 2000 may receive electronic data and maintain a plurality of user profiles (3000A, 3000B through 3000*n*) based on received electronic data for each of those electronic devices (600A, 600B through 600*n*). Any of the above described data gathering and correlation techniques may be employed by the management module(s) 2000 to facilitate maintenance of the user profiles (3000A, 3000B through 3000n). The user profiles may contain any of the electronic device data or the deduced information, as described above. The management module(s) 2000 may, from time to time, select media for presentation to one or more of the users (900A, 900B through 900n). The selected media may be displayed to one or more of the users (900A, 900B through 900n) via one or more media output devices 4000 co-located with one or more of the users (900A, 900B through 900n). For example, media may be output via a mobile electronic device of a user, such as a mobile phone and/or one or more other displays co-located with a user, such as a billboard, television, or computer.

Figure 10A:
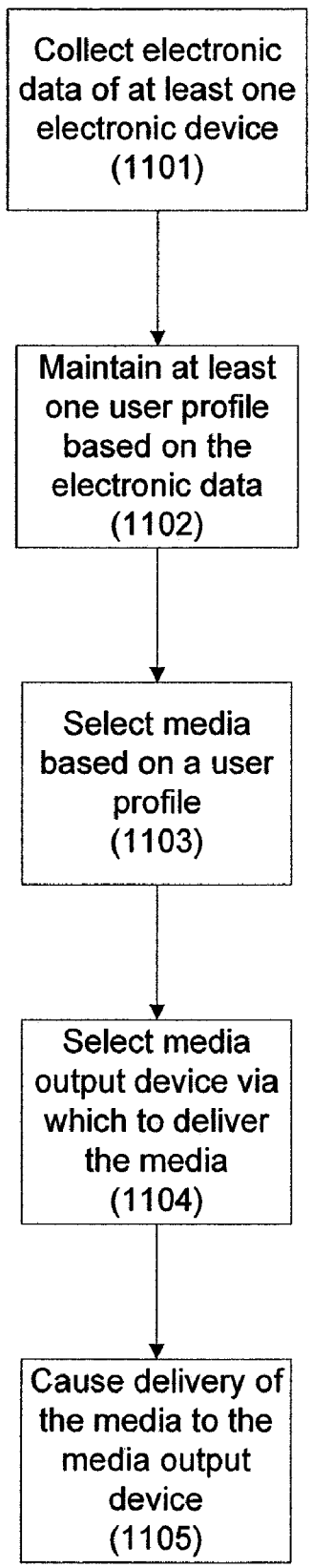
FIG. 10a is a block diagram illustrating one embodiment of a method for presenting media.

Methods of presenting media to a user are also provided, an embodiment of which is illustrated in FIG. 10*a*. In this embodiment, the method includes the steps of collecting electronic data of at least one electronic device 1101, maintaining at least one user profile based on the electronic data 1102, selecting media based on at least one user profile 1103, selecting a media output device via which to deliver the selected media 1104, and causing delivery of the selected media to the selected output device 1105.

The collecting step 1101 may be accomplished via, for example, a data gathering module resident on the electronic device. The collecting step 1101 may also include the collecting of and receiving of information from other sources, such as from vendors and relations of the user and/or user interaction with other electronic devices, as described in further detail below.

The collected data is generally maintained at a central location to facilitate the maintenance of the user profiles. For example, the user profiles may be maintained on a remote server. In one approach, the collected electronic data is periodically uploaded to the remote server via data management modules. In another approach, data is provided to the server via a wired connection (e.g., the Internet, a telephone network, a cable television network). In another approach, the collected data is maintained at the electronic device on which the data is collected.

The maintaining a user profile step 1102 generally includes the step of creating and/or updating user profiles based on the collecting data step 1101. The maintaining a user profile step 1102 may also include the step of producing deduced information. As described above, the deduced information may be deduced based on collected electronic data. As described above, the deduced information may comprise any one of past location information, present location information, predicted future location information, past activity information, present activity information, predicted future activity information, primary location information, secondary location information, preferences information, and social network information. Thus, the step of maintaining a user profile may include the step of receiving collected electronic data, deducing deduced information based on collected electronic data, and updating a user profile to include at least some of the deduced information. As described above, the deduced information is generally deduced by correlating one or more of spatial data, temporal data, and/or interaction data.

In a particular embodiment, the maintaining a user profile step 1102 may comprise comparing a first user profile to at least one other user profile to produce at least some deduced information. In this regard, it is noted that, sometimes, information about one user may be deduced from information about a second user, especially when such users share common characteristics, such as a common social network, a common preference, a common age group, and/or a common geographic location, to name a few. Thus, the step of maintaining the user profiles 1102 may include the steps of comparing a first user profile to at least one other user profile, producing deduced information based on this comparing step, and maintaining at least one of the user profiles to include at least some of this deduced information.

The deduced information may also be deduced based on previously deduced information. For example, first deduced information may be deduced based off spatial, temporal, and/or interaction data, as noted above. This first deduced information may provide a good basis for deducing other deduced information. Thus, this first deduced information may be correlated with temporal data, spatial data, and/or interaction data to produce second deduced information. At least one user profile may be maintained based on at least a portion of the second deduced information.

In a related embodiment, deduced information may be deduced based on a correlation of first deduced information and second deduced information, either of which may be deduced based on any of spatial data, temporal data, interaction data, and deduced information. In this regard, third deduced information may be deduced by correlating the first deduced information with the second deduced information. At least one user profile may be maintained based on at least a portion of this third deduced information.

The selecting media step 1103 generally comprises utilizing at least a portion of the user profile (e.g., current location information). In one approach, a dynamic media delivery analysis is completed where at least a portion of the user profile is compared to metadata of a media inventory and media is then selected based on the comparison. In one embodiment, characteristics of the user profile may be compared to characteristics of the media to facilitate selection of the media. For example, locations of one or more users may be compared to media inventory metadata to determine whether any of the media may be suitable for delivery to any of those locations. In turn, media may be delivered to those users, or a further comparison of the media metadata to the user profiles may be undertaken to further tailor the media and/or ascertain whether to present the media. Thus, targeted media presentation, irrespective of user location, may be achieved.

The selecting the media step 1103 may be initiated by any suitable trigger. For example, the selecting the media step may be initiated based on spatial data and/or temporal data, such as when the user and/or the mobile electronic device of the user are located in a desired geographical vicinity, or at a desired time. The trigger may be in accordance with a given media content, such as concomitant with clearing, accessing, viewing, editing and/or production of a given price of media content. For example, when the price of merchandise and/or services attains a certain level, the selecting media step 1103 may be triggered. The trigger may also be a community type trigger, wherein the media is selected when the user is co-located with a given person or persons, or when the user communicates with a given person or persons. The trigger may also be a commerce type trigger, wherein the media is selected with the occurrence of a type of commercial transaction. Any one of these triggers may be used alone to trigger the selecting media step 1103, or may be used in any combination to trigger the selecting media step. The media selection may be accomplished at the electronic device or may be accomplished remotely from the electronic device, such as on a server remote from the electronic device.

The selecting a media output device step 1104 is generally accomplished by comparing the user's present location or predicted future location to a catalogue of media output devices proximal at least one of those locations. For example, it may be determined that a user of an electronic device is co-located with one or more displays (e.g., co-located with a television at a friend's house). This determination may be based on the user profile, which may include current location data. Upon determining which displays are co-located with the user, one or more of those displays may be selected for delivery of the selected media. In one approach, a mobile electronic device associated with the user is selected as the media output device. In another approach, a different media output device co-located with the user is selected, such as a billboard, television, computer or any other display, and/or a speaker or other audio output device co-located with the user, and/or another sensory output device co-located with the user (e.g., a taste, smell or touch sensory output device). Any one of these media output devices alone or in any combination may be selected to provide media.

In one embodiment, the media may be delivered to at least two media output devices co-located with the user, such as a first media output device, which may be an output device of a mobile electronic device, and a second media output device, which may be a visual display, not including the mobile electronic device output. Upon selection of the one or more media output devices, the media may be transformed to the appropriate format for delivery to the at least two media output devices. For example, the first media may be delivered in an audio-only format, such as when a user is driving and the media is to be delivered to a mobile electronic device co-located with the user. Concomitantly, a related media may be delivered to a billboard located proximal the road/highway on which the user is driving. The audio media provided to the mobile electronic device may convey to the user of the mobile electronic device that a visual message is about to be displayed via the above-noted billboard (e.g., "User, don't forget, your wife's birthday is tomorrow. This message brought to you by ABC Jewelers, conveniently located just off the next exit.").

The media output device may be selected using the at least one electronic device or may be selected using another electronic device, such as via a server remote from the at least one electronic device. In turn, the causing of the delivery of the media step 1105 may also be accomplished at the at least one electronic device, or may be accomplished remote from the at least one electronic device, such as on the server remote from the at least one electronic device. Any known or developed methods of causing delivery of media to an electronic device may be used, such as wireless communication.

Figure 10B:
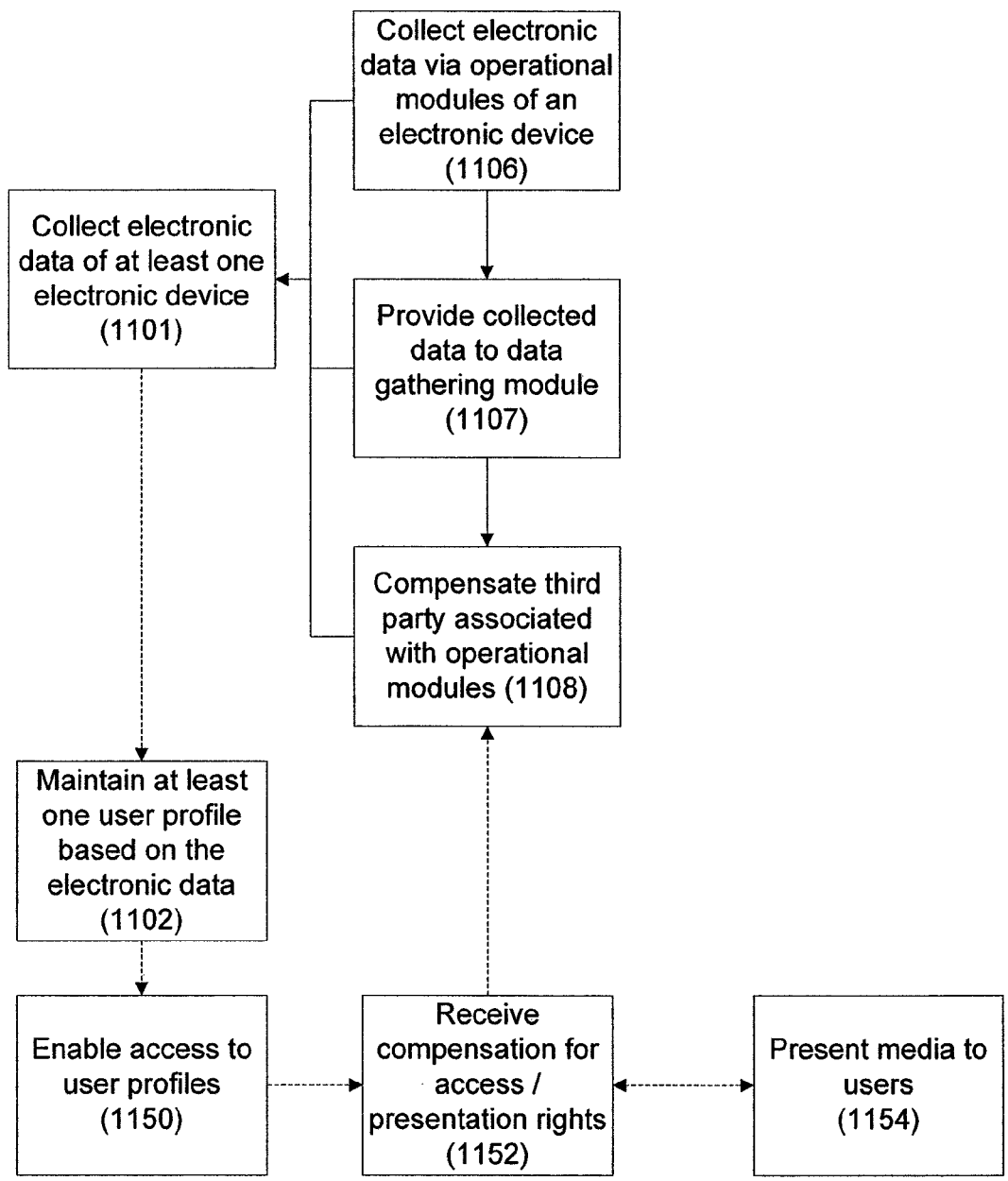
FIG. 10b is a block diagram illustrating one embodiment of a method for facilitating collection of data.

As may be appreciated, modules of an electronic device may be proprietary and thus, it may be difficult to receive information from such modules. However, if the manufacturers of such modules, or other parties associated therewith, had an incentive to provide collected information, they might agree to facilitate sharing of information between the data gathering module and those modules, making it easier to collect information. In this regard, the present invention also encompasses methods for facilitating collection of information associated with a mobile electronic device, one embodiment of which is illustrated in FIG. 10*b*. In the illustrated embodiment, the method includes the steps of collecting electronic data via one or more operational modules of an electronic device 1106, providing the collected data to a data gathering module 1107, and compensating the third party associated with the operational modules for providing the collected data 1108. Thus, methods of collecting electronic data of at least one electronic device 1101 may be facilitated.

One manner of compensating the third parties may be to provide the third parties with at least a portion of the compensation received from others for providing access to the user profiles and/or for allowing presentation of media rights, as described in further detail below. In this regard, the method may also include the steps of maintaining at least one user profile based on the electronic data 1102, such as described above, and enabling access to one or more of those user profiles 1150. As described in further detail below, compensation may be received 1152 for enabling access to such user profiles 1150 and/or for providing rights to present media to users 1154. At least a portion of this compensation may be provided to the third parties associated with the operational modules that provide collected electronic data.

In one embodiment, a user profile may comprise first information and second information, the first information being based on data collected by a first operational module of the mobile electronic device, and the second information being based on data collected by a second operational module of the mobile electronic device. In this regard, the method may include the step of compensating a party who enabled the provision of the first information at a first compensation rate. The method may also include the step of compensating a party who enabled the provision of the second information at a second compensation rate. In a particular embodiment, the first compensation rate may be related to a ratio of the amount of first information within the user profile to a total amount of information within that user profile. In turn, the second compensation rate may be related to a ratio of the amount of second information in the user profile compared to the total amount of information in the user profile.

Difficulties may arise in obtaining user permission to collect data. For example, privacy concerns and/or privacy laws may be implicated by gathering one or more of the spatial, temporal and/or interaction data. To overcome such concerns and/or laws, methods may be employed for obtaining user agreement to the data collection. For example, a user may agree to allow collection of data for compensation. In one instance, a user may be provided an electronic device having a data collection module resident thereon at a discount, or for free, in return for an agreement by the user to allow collection of electronic data. In another instance, users may be compensated in proportion to the amount of data they collect and share.

Figure 10C:
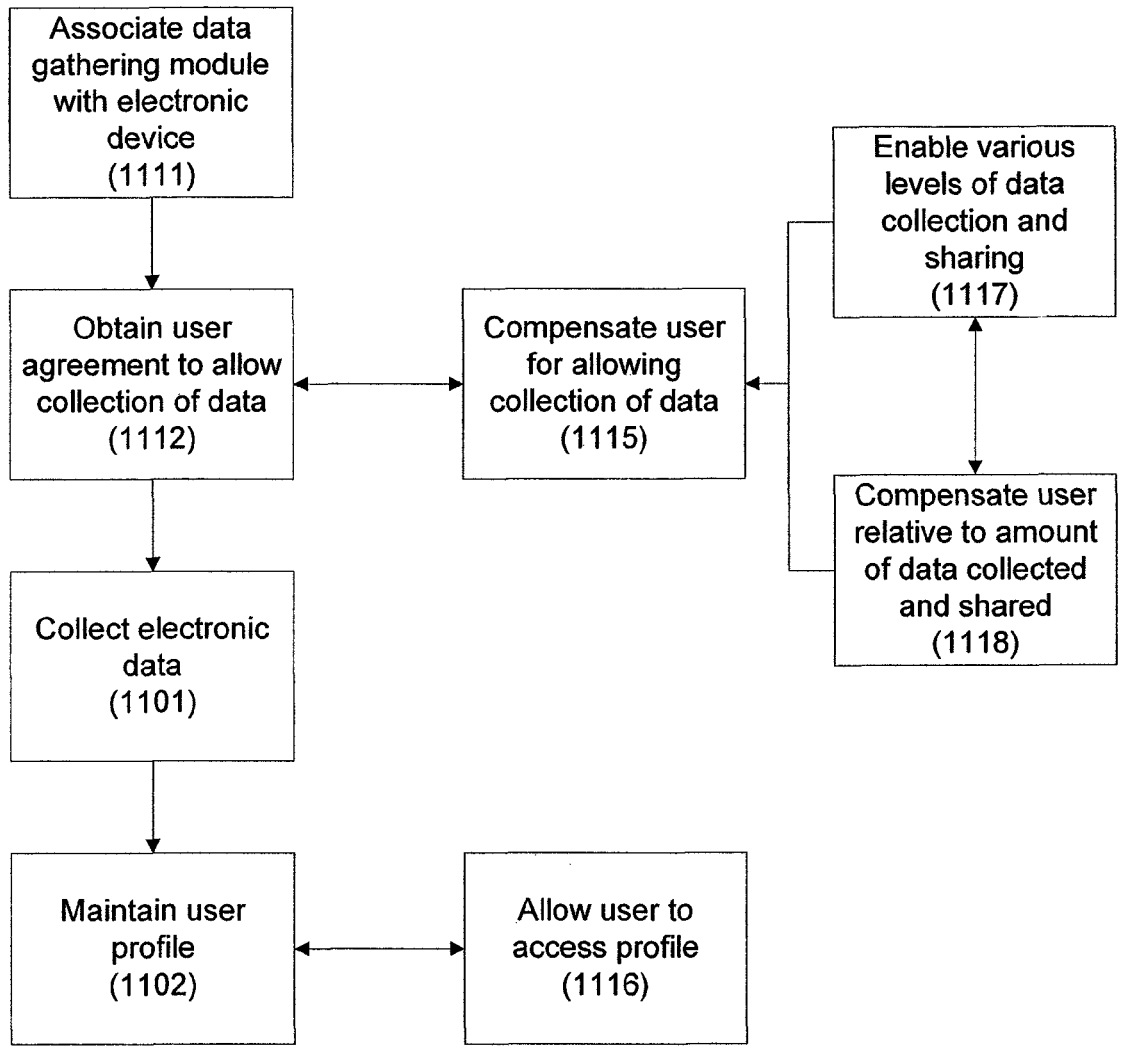
FIG. 10c is a block diagram illustrating one embodiment of a method for facilitating collection of data.

One method of facilitating collection of electronic data is illustrated in FIG. 10*c*, the method including the step of associating a data gathering module with an electronic device 1111, obtaining user agreement to allow collection of data 1112, collecting electronic data of the electronic device 1101, such as described above, and maintaining a user profile based on the collected electronic data 1102, as described above. As may be appreciated, users may be hesitant to allow data collection. Thus, one embodiment includes compensating a user for allowing collection of data 1115 in exchange for an agreement by the user to allow the collection of the data. As discussed in further detail below, the compensation may be based on the various levels of data collected and shared 1117, and the compensation provided to the user may be relative (e.g., proportional) to the amount of data collected and shared by the user 1118. Since, in this embodiment, the user is allowed to choose the amount of data that is collected and shared, user privacy concerns may be curtailed.

Figure 10D:
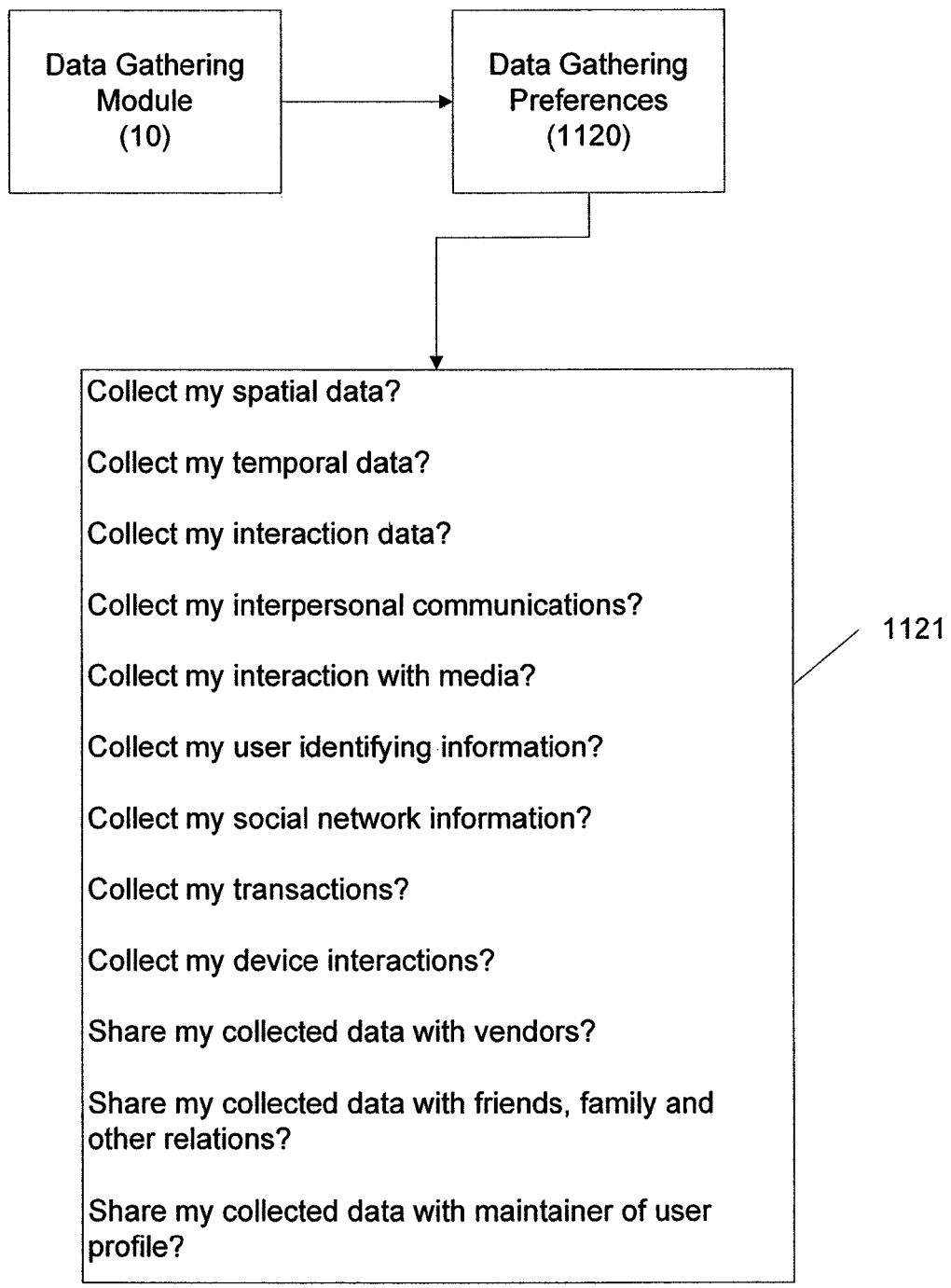
FIG. 10d is a schematic view illustrating one embodiment of a data gathering preferences section of a data gathering module.

One system for facilitating selection of data collecting and sharing levels is illustrated in FIG. 10*d*. In the illustrated embodiment, a data gathering module 10, such as described above, includes a data gathering preferences module 1120, which allows the user to select one or more data collection options 1121. For instance, the data gathering preferences module 1120 may allow the user to select whether to collect any of the spatial data, the temporal data, and the interaction data, such as the interpersonal communication data, media data, user identifying information data, social network information data, transactional data and/or device interaction data, and whether to share such data. Thus, the user can select the amount of data to be collected and to whom this data can be shared. In the latter regard, various permission levels may be set for the sharing of the collected data. In one approach, the data preference modules 1120 may enable the user to select the levels at which collected data will be shared with various relations. By way of primary example, collected data may be shared with family at a first level and collected data may be shared with businesses at a second level, the first level including a greater amount of collected data than the second level. In one instance, a first type of data may be selected to be shared with a first entity (e.g., friends), but at least some of that first data is not selected to be shared with a second entity (e.g., businesses). Many other data collecting and sharing preference combinations are possible and all such combinations are within the scope and spirit of the instant invention.

As noted, and with reference back to FIG. 10*c*, methods of compensating the user for allowing data collection 1115 may be based on the amount of data the user allows to be collected and shared 1118. For example, a first tier of compensation may be provided if the user allows the collection and sharing of data at a first level, such as sharing of at least some spatial data category. A second tier of compensation, which may be higher than the first tier of compensation, may be provided if the user allows the collection and sharing of a data at second level, such as allowing the collection of more spatial data, temporal data and/or interaction data, or allowing the sharing of data with more entities (e.g., friends, family, co-workers, business relations, vendors, government entities, and other entities). In turn, third, fourth, and so on, levels of compensation may be provided for the collection and sharing of even greater amounts of data or the sharing of data with more entities. The compensation may be provided by the maintainer of the user profile and/or other parties interested in obtaining data related to users and/or their electronic devices, such as advertisers or vendors.

Figure 10E:
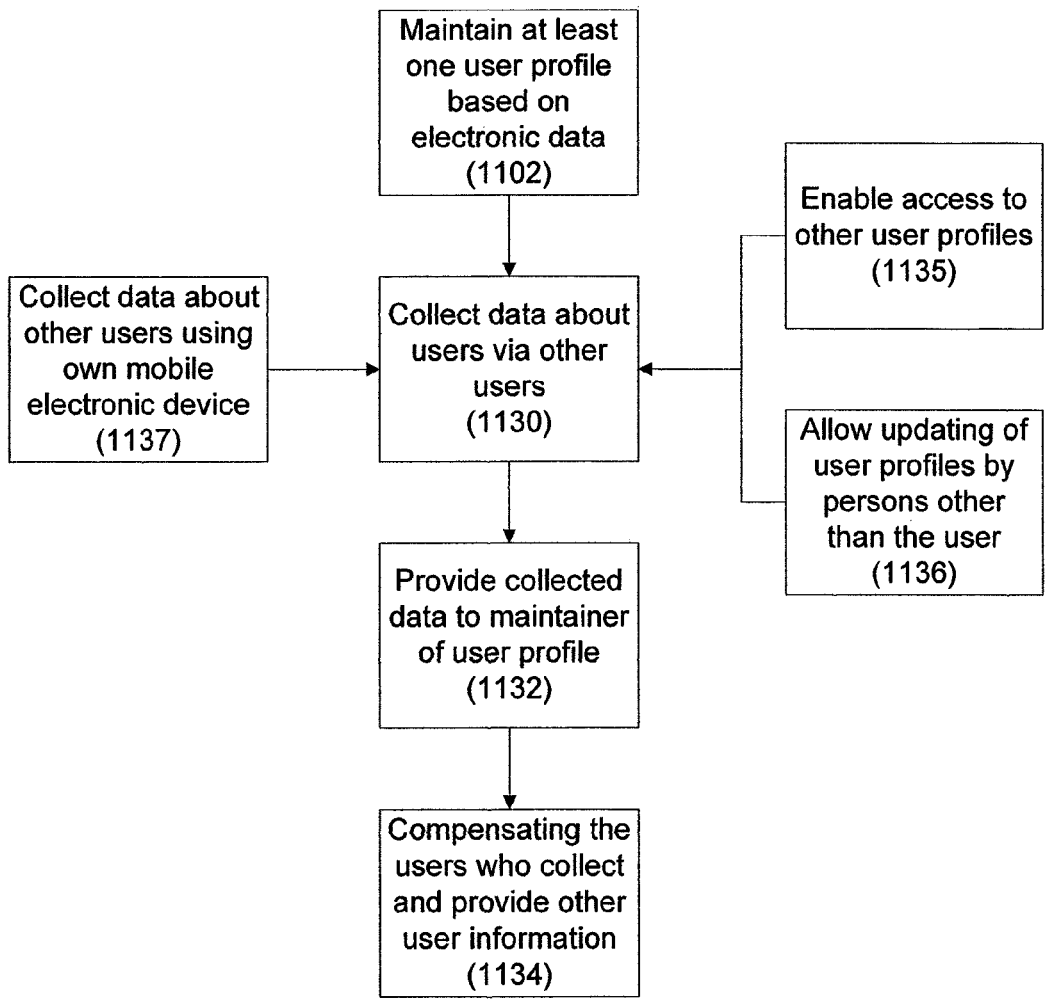
FIG. 10e is a block diagram illustrating one embodiment of a method for facilitating collection of data.

Methods for facilitating collection of user information utilizing other users are also provided, one embodiment of which is illustrated in FIG. 10*e*. In the illustrated embodiment, the method includes the steps of maintaining at least one user profile 1102, such as described above, collecting data about users via other users 1130, providing the other user data to a maintainer of the user profiles 1132, and compensating users 1134 for at least one of the collecting the other user data step 1130 and the providing the other user data step 1132.

The collecting other user data step 1130 may be accomplished in a variety of manners, such as via personal area network communications between one or more mobile electronic devices 1137. In this regard, it will be noted that, when such mobile electronic devices are proximal other personal area network enabled communication devices, those devices may share information. Thus, when a first user is proximal other users who have enabled personal area network communications, the first user may collect information about those users via his/her mobile electronic device. As may be appreciated, the first user may not normally have an incentive to collect such other user data information. However, by providing compensation to the first user, an incentive is realized, and the first user may collect such other user data and provide such other user data to a maintainer of the user profiles. In return, the maintainer of the user profiles may compensate the first user for collecting and/or providing the other user data. In one embodiment, the maintainer of the user profiles may compensate this first user via monetary compensation. In another embodiment, the first user may be compensated via discounted merchandise and/or services, such as via discounted or free mobile electronic devices and/or discounted or free services relating thereto.

In a related embodiment, the maintainer of the user profiles may desire others to update user profiles. Thus, the method may also include the steps of enabling access, by a first user, to at least a portion of other user profile information 1135, allowing the first user to review and/or update the other user profile information 1136, and compensating the first user for updating the user profile information 1134. In this regard, the enabled access may be provided via a network, such as the Internet, or by downloading at least a portion of the other user profile(s) to the mobile electronic device of the first user.

Figure 10F:
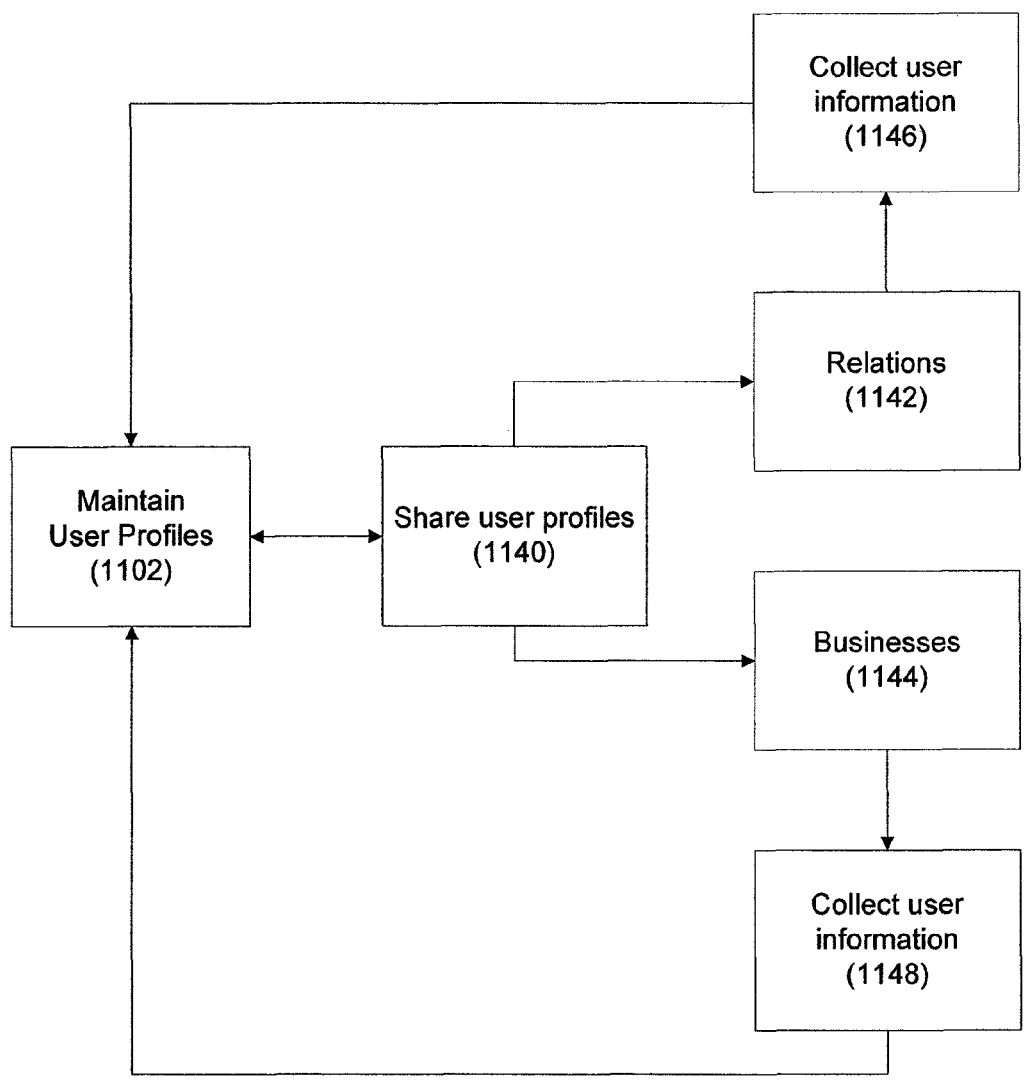
FIG. 10f is a block diagram illustrating one embodiment of a method for sharing and collecting user information.

As noted above, the methods may include the step of maintaining at least one user profile based on electronic data. Maintenance of the user profiles is important to provide accurate user profile data, which may increase third party demand for such user profiles. In this regard, and with reference to FIG. 10*f*, one or more user profiles may be shared with third parties 1140, such as relations of the users 1142 or businesses 1144. In one approach, the user profiles are shared with relations 1142 (e.g., family, friends, businesses, government entities, and other relations) and those relations receive at least a portion of the user profile, such as via an electronic device, such as a mobile phone capable of communicating via a personal area network. The electronic devices of the relations 1142 may also have data collecting capability and may store and share data, not only relating to their electronic device, but also from the electronic devices of other users, thus enabling the collection of other users information 1146. In turn, this other users information may be provided to the maintainer of the user profiles, who may maintain the user profiles 1102 based thereon. In this regard, it should be noted that, since many of the mobile electronic devices may be uniquely identified, such as via a data gathering module having a unique identifier associated therewith or via a phone number, associating the collected data with other user profiles may be readily facilitated.

In a related embodiment, user profiles may be shared with one or more businesses 1144. In this regard, the businesses 1144 may agree to collect user information based on interaction of user and the business (e.g., transactional data, browsing habits data). For example, the businesses 1144 may agree to collect user information 1148 via interactions with mobile electronic devices (e.g., via a personal area network). The businesses may agree to share this collected user information 1148 with the maintainer of the user profile, such as via a compensation arrangement. One compensation arrangement would be a joint data sharing arrangement, wherein the maintainer of the user profiles agrees to provide a portion of the user profile to the business in return for an agreement by the business that it will share at least some of its collected user information 1148. Thus, the business may be able to present targeted media to the users and the maintainer of the user profiles may be able to maintain more accurate user profiles.

In a particular embodiment, and with reference to FIG. 10*g*, one method for receiving compensation includes the steps of collecting electronic data of at least one electronic device 1101, maintaining at least one user profile based on the electronic data 1102, enabling access to one or more of user profiles 1150, and receiving compensation for enabling access to the user profiles 1152. The collecting of electronic data step 1101 and maintaining user profile step 1102 may be completed, as described above. Enabling access to user profiles 1150 may be completed in a variety of manners, such as by allowing vendors to access a database containing at least a portion of user profiles. In another embodiment, at least a portion of the user profiles may be sent to the vendors for their access.

Irrespective of how access is provided, the illustrated embodiment provides for receiving compensation for enabling access to the user profiles 1150. As noted above, the collecting electronic data step 1101 may enable the maintenance of rich user profiles, thereby allowing one or more vendors to readily identify which users to present targeted media. Thus, vendors may be willing to provide compensation to the maintainer of those user profiles, and in some circumstances, directly to the users themselves, in order to receive such user profiles. For example, the vendor may be willing to provide monetary, merchandise, and/or service compensation in return for access to at least a portion of the user profiles. In another embodiment, the vendors may be willing to provide access to the user information those vendors collect in return for access to at least a portion of the maintained user profiles.

For example, a plurality of users having electronic devices may be proximal a plurality of food service locations, at least some of which are adapted to receive at least a portion of the user profiles associated with the mobile electronic devices. Those food service businesses may review received user profiles and, upon locating one or more user profiles that are in accordance with certain media delivery preferences, such as cultural and/or buying preferences of the user, may bid for a right to provide a coupon, an advertisement, or other media to one or more of the users. In one approach, the businesses may take into account their own conditions, such as economic conditions, capacity rate, and a food delivery rate, to name a few, to facilitate whether compensation is justified for obtaining access to the user profiles and/or providing media to the users of the user profiles. As noted, the compensation may be provided to the maintainer or supplier of the user profiles, and in one approach at least some of the compensation is provided to one or more users for sharing their individual profiles, such as when the users have a personal area network enabled that allows the sharing of the user profile locally with the vendors. In one approach, the maintainer of the user profile may require an access charge to access one or more of the user profiles. This access charge may be charged on a per access basis, a time basis (e.g., unlimited access for one week), or otherwise.

In another embodiment, the method may include the step of receiving, from one or more vendors, offers for an exclusive right to present media to a first user 1156, the first user being associated with the user profile received by the one or more vendors. Thus, after access to the user profiles has been enabled 1150, a reverse auction mechanism may be utilized to determine a right to provide media. Thus, the method may also include the step of accepting one of the offers 1158, and enabling the presentation of the media to the first user 1154.

In a particular embodiment, the method includes the step of receiving a request for greater access to the user profiles 1151. In this regard, the enabling access step 1150 may provide access to a first tier of the user profile, and the receiving compensation step 1152 may include receiving a first level of compensation. Concomitantly or afterwards, a request from one or more of the vendors for greater access to the user profiles may be received 1151, the request requesting access to at least a second tier of the user profile, the second tier of the user profile including information of the user profile not included in the first tier of the user profile. For example, the first tier may be akin to an abstract of each of the user profiles, and the second tier may include more detailed information than contained in the abstract. The method may further include the step of enabling access to the second tier of the user profile and receiving additional compensation therefore, the latter of which has been included in step 1152 in the illustrated embodiment for the sake of clarity. This additional compensation may be any of the above-noted types of compensation.

As noted above, the enabling access step 1150 may be provided by the maintainer of the user profiles or may be enabled by the users themselves. Thus, one embodiment of the present method provides for facilitating access to the user profile information by a first user. In this regard, the compensation may be provided directly to the first user, as described in further detail below.

Figure 10H:
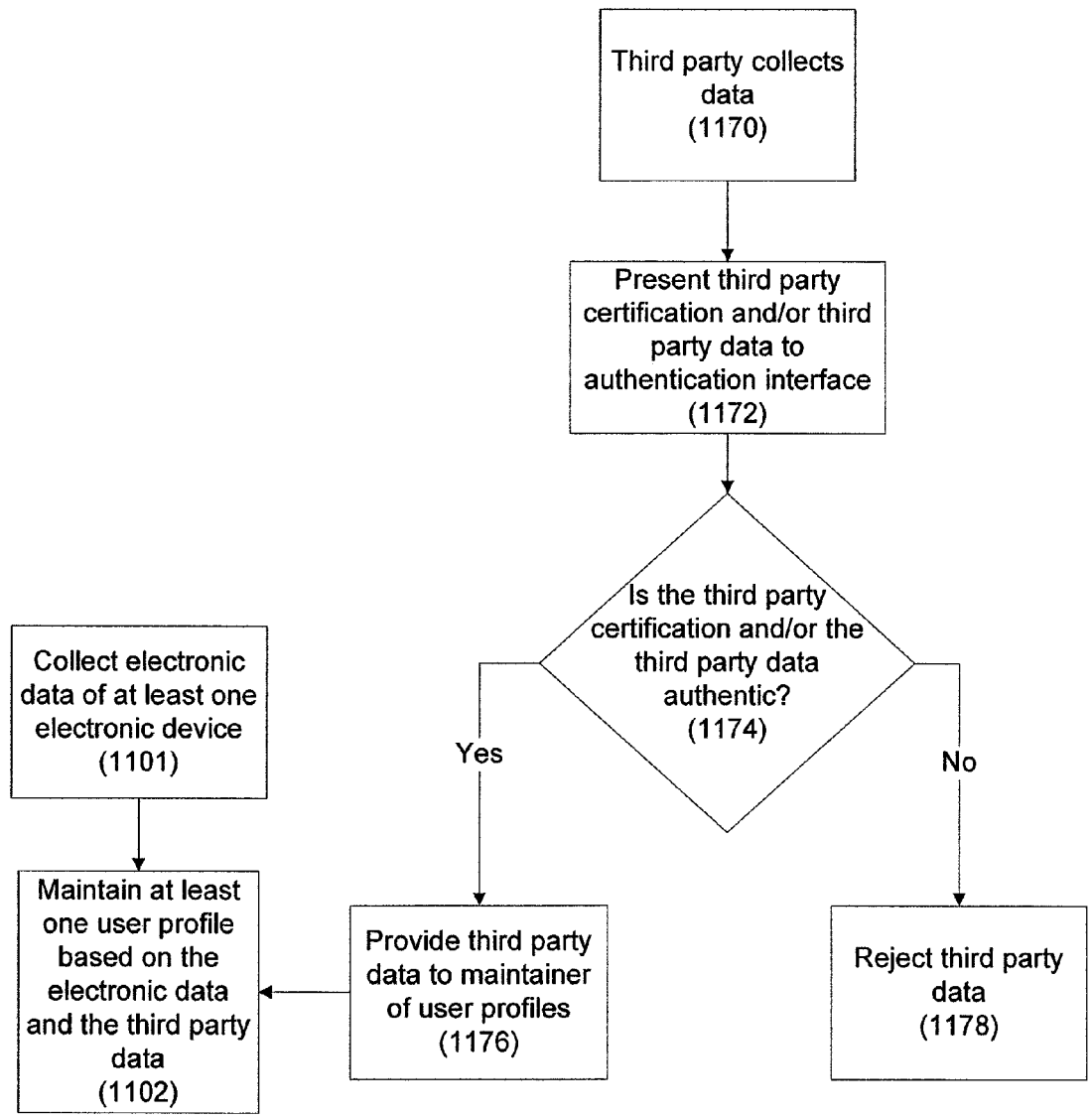
FIG. 10h is a block diagram illustrating one embodiment of a method for authenticating third party data.
Figure 10I:
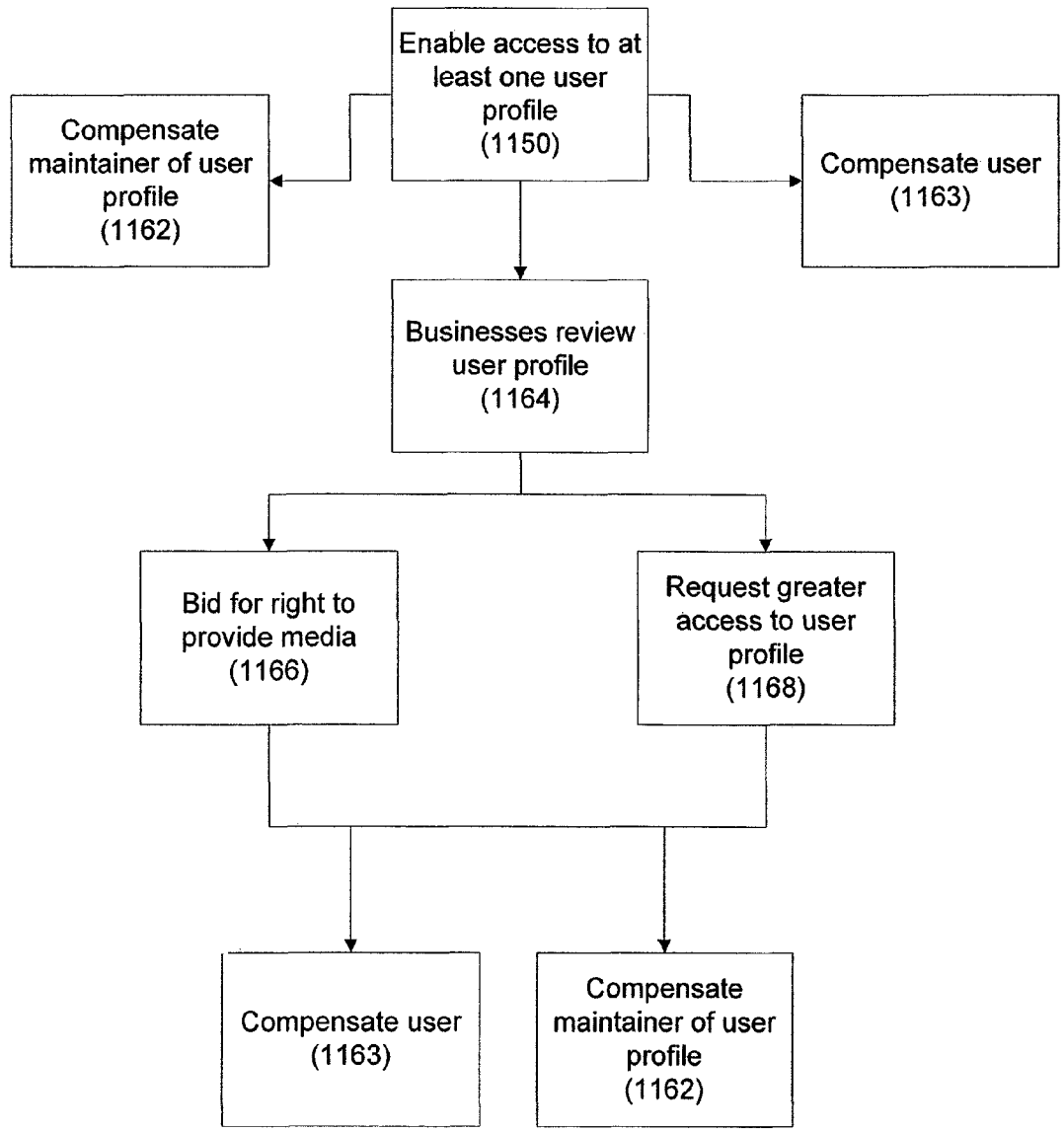
FIG. 10i is a block diagram illustrating one embodiment of a method for receiving compensation by sharing access to user profiles.
Figure 10J:
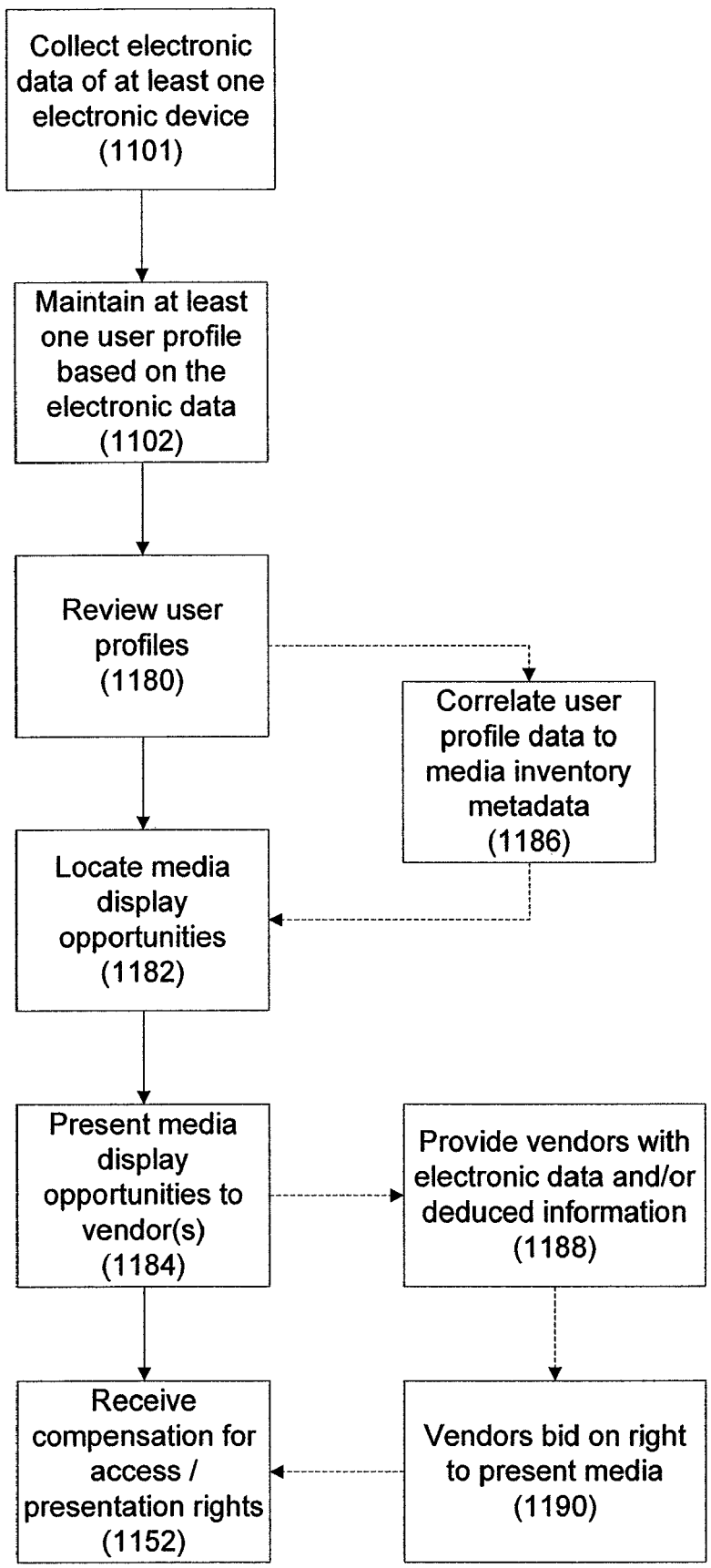
FIG. 10j is a block diagram illustrating one embodiment of a method for presenting media display opportunities.

In another embodiment, and with reference to FIG. 10*j*, the method may include the step of reviewing one or more of the user profiles 1180 and locating one or more media display opportunities based on the review 1182. For example, a dynamic media display opportunity analysis may be completed, wherein the data of the user profiles are correlated with metadata associated with media of a media inventory 1186 and various ones of the user profiles, which, for example, meet one or more media opportunity criteria, may be selected as media display opportunities. Concomitantly or afterwards, the method may include the step of presenting one or more of the media display opportunities to one or more vendors 1184. For example, an electronic communication may be made between the maintainer of the user profiles and the vendors to notify the vendors of the media display opportunity. Such communication may include data about the opportunity, such as electronic data and/or deduced information associated with one or more of the user profiles 1188. In particular, the communication may include one or more of current location information, predicted future location information, predicted future activity information and preferences information. The vendors, in turn, may review the data and/or provide compensation for the right to display targeted media to one or more of the users 1154, such as via an auction mechanism, e.g., where vendors bid for the right to present media 1190, or by meeting a minimum threshold compensation level, as determined by the maintainer of the user profiles and/or the user themselves.

As noted, data obtained by other sources, such as businesses and government entities, may also be used to maintain the user profile (1102). One issue associated with the use of such data is authenticity. Inaccurate data can lead to inaccurate user profiles, and thus presentation of less preferred media. In this regard, an authentication interface, such as an application server utilizing an API may be utilized to authenticate the provider of the information and/or to authenticate the information itself. In one embodiment, and as illustrated in FIG. 10*h*, spatial data, temporal data and/or interaction data gathered by one or more businesses or government entities 1172 may be presented to an authentication interface 1174 via a network, such as the Internet. The authentication interface may authenticate the third party (e.g., via a digital certificate) prior to allowing the data to be utilized in maintaining the user profiles 1102 and/or or the authentication interface may authenticate the data itself, such as via a comparison of the collected data to authenticating information, such as via user identity data and/or transactional data. In the latter regard, a plurality of data provided by the third party may be reviewed and compared against known user profiles to determine whether the data is sufficiently authentic to justify use in maintaining user profiles. If the comparison indicates that the data is authentic (e.g., a predetermined number of authentication criteria are met) the third party data may be provided to a maintainer of the user profiles 1176 and complied with preexisting data to facilitate maintenance of the user profile 1102. If the comparison does not indicate that the data is authentic, the data may be rejected 1178. Hence, collection and authentication of data from third parties is facilitated. As described above, such third parties may be compensated for the authentication of and/or the provision of the data.

As noted above, the method may include the step of selecting media based on the user profile. As described above, one way of selecting media is to compare at least a portion of the user profile to data associated with media of the media inventory and select one or more media based on the comparison. A related embodiment of selecting media is provided in FIG. 10*i*. In the illustrated embodiment, the media selection may be facilitated by enabling access to at least a portion of the user profile 1150, such as to one or more businesses, for which compensation may be provided to the user 1163 or the maintainer of the user profile 1162. The businesses may receive at least a portion of the user profile and review the profile 1164 to ascertain whether they may be interested in providing media to the user of the user profile. For example, the businesses may review the profile to determine whether the profile matches one of the parameters associated with delivery of media criteria, such as cultural preferences, buying preferences, relationship data, and/or predicted future locations and/or predicted future activities data. If the businesses are not interested in providing media to the user, nothing further may occur. However, if the businesses are interested in providing media to the user, those businesses may, for example, bid for the right to provide the media 1166 or request greater access to the user profiles 1168. In either case, compensation may be provided to one of the user 1163 and the maintainer of the user profile 1162.

While various embodiments of the present invention have been described in detail, it is apparent that modifications and adaptations of those embodiments will occur to those skilled in the art. However, it is to be expressly understood that such modifications and adaptations are within the spirit and scope of the present invention.

What is claimed is:

1. A system comprising:
    a processor;
    a user data gathering module implemented by the processor, said user data gathering module is in communication with a mobile electronic device, such that the user data gathering module gathers electronic device data of the mobile electronic device, the electronic device data comprising spatial data, temporal data, and interaction data, the interaction data comprising relationship data relating two or more users in a social network of users, such that a user associated with the mobile electronic device is compensated for the gathering of the electronic device data of the mobile electronic device at a first level of compensation for the collection of a first type of the electronic device data and at a second level of compensation for a second type of the electronic device data wherein the first and second levels of compensation are based on respective ratios of amounts of the first and second type of electronic device data to total data comprised in a user profile of the user;
    an authenticator implemented by the processor for receiving third party data from at least one third party and authenticating said third party data, the third party data comprising spatial data, temporal data, and interaction data;
    a profile management module implemented by the processor that stores the electronic device data and the third party data;
    a user profile associated with the user, such that the profile management module manages the user profile comprises at least some of the electronic device data and the third party data and such that the user profile additionally includes deduced information that is deduced by correlating the spatial data, the temporal data, and the interaction data in the electronic device data and the third party data; and
    a media presentation module implemented by the processor that selects media from a media inventory by correlating the user profile with metadata associated with the media, selects one media output device from a plurality of media output devices, and delivers the selected media to the one media output device, such that the one media output device is selected by comparing the user profile to each media output device of the plurality of media output devices.

2. The system of claim 1, wherein the interaction data additionally comprises interpersonal communication data, media data, relationship data, transaction data, and device interaction data.

3. The system of claim 2, wherein the relationship additionally comprises user identity data.

4. The system of claim 1, wherein the user profile additionally comprises past location data, present location data, and predicted future location data.

5. The system of claim 1, wherein the deduced information comprises past activity information, present activity information, predicted future activity information, and preferences information.

6. The system of claim 1, wherein the user profile is one of a plurality of user profiles, wherein the profile management module manages the plurality of user profiles, and wherein at least some of the deduced information is deduced based at least on a comparison of two or more of the plurality of user profiles.

7. The system of claim 6, wherein each of the plurality of user profiles is associated with an electronic device, and wherein the media presentation module selects media for presentation to at least one of the electronic devices based at least on a comparison of two of the plurality of user profiles.

8. A method comprising:
    collecting, at a computing device, electronic device data for a plurality of mobile electronic devices, each mobile electronic device of the plurality of mobile electronic being associated with a respective one user of a plurality of users, the electronic device data comprising temporal data, spatial data and interaction data, such that the interaction data comprises relationship data relating two or more users in a social network of users;
    compensating, by the computing device, each user of the plurality of users for the collecting electronic device data, each of the plurality of users is compensated at a first level of compensation for collection of a first type of the electronic device data and at a second level of compensation for a second type of the electronic device data wherein the first and second levels of compensation are based on respective ratios of amounts of the first and second type of electronic device data to total data comprised in respective user profiles of the plurality of users;
    receiving, at the computing device, third party data from a third party, the third party data comprising temporal data, spatial data and interaction data;

authenticating, via the computing device, the electronic device data and the third party data;

maintaining, via the computing device, the respective user profiles of the plurality of users based on the electronic device data and the third party data;

deducing, by the computing device, deduced information for at least a portion of the plurality of user profiles by correlating temporal data, the spatial data, and the interaction data in the electronic device data and the third party data;

updating, by the computing device, the at least a portion of the plurality of user profiles to include the deduced information;

selecting, via the computing device, media from a media inventory by correlating one user profile of the plurality of user profiles with metadata associated with the media;

comparing, via the computing device, the one user profile of the plurality of user profiles to each media output device of a plurality of media output devices, so as to select one media output device of the plurality of media output devices to which the selected media is to be delivered;

transforming the selected media for delivery to the one media output device of the plurality of media output devices; and causing, via the computing device, the delivery of the selected media to the one media output device.

9. The method of claim 8, wherein the authenticating step comprises:

comparing a third party certificate to authenticating information; and allowing use of the third party data for the maintaining step.

10. The method of claim 8, wherein the authenticating step comprises:

comparing the third party data to preexisting data of the user profiles;

determining whether the third party data satisfies a predetermined number of authenticating criteria; and allowing use of the third party data for the maintaining step.

11. The method of claim 10, wherein the deduced information is first deduced information and wherein the method further comprises:

correlating the first deduced information with the electronic device data and third party data;

producing second deduced information based on the correlating step; and updating one of the plurality of user profiles to include the second deduced information.

12. The method of claim 8, wherein the deduced information comprises past location information, present location information, predicted future location information, past activity information, present activity information, predicted future activity information, primary location information, secondary location information, preferences information and social network information.

13. The method of claim 12, wherein the deducing step comprises:

comparing a first user profile to one other user profile;

deducing the deduced information based on the comparing step; and updating one of the plurality of user profiles to include at least some of the deduced information.

14. The method of claim 8, wherein the selecting media step comprises:

comparing at least a portion of one user profile of the plurality of user profiles to metadata associated with media of the media inventory; and selecting one of the media of the media inventory based on the comparing step.

15. The method of claim 8, wherein the one media output device of the plurality of media output devices is a device associated with the third party.

16. The method of claim 8, wherein the interaction data additionally comprises interpersonal communication data, media data, relationship data, transaction data and electronic device interaction data.

17. The method of claim 8, wherein the selecting media from a media inventory is triggered by a co-location of two users of the plurality of users.

18. The method of claim 8, wherein the selecting media from a media inventory is triggered by a commercial transaction.

19. The method of claim 8, wherein the selecting media from a media inventory is triggered by a communication between a first user of the plurality of users and a second user of the plurality of users.

20. The method of claim 8 wherein the first type of the electronic device data is spatial information and the second type of the electronic device data is temporal data or interaction data.

* * * * *